(12) United States Patent
      Zhu

(10) Patent No.: US 12,666,033 B2
(45) Date of Patent: Jun. 23, 2026

(54) METHODS AND APPARATUSES FOR DECODING AND ENCODING POINT CLOUD DATA

(71) Applicant: Tencent Technology (Shenzhen) Company Limited, Shenzhen (CN)

(72) Inventor: Wenjie Zhu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 11 days.

(21) Appl. No.: 18/919,987

(22) Filed: Oct. 18, 2024

(65) Prior Publication Data

US 2025/0047859 A1     Feb. 6, 2025

Related U.S. Application Data

(63) Continuation of application No. PCT/CN2023/106256, filed on Jul. 7, 2023.

(30) Foreign Application Priority Data

Aug. 19, 2022    (CN) .......................... 202211003838.7

(51) Int. Cl.
    *H04N 19/136*      (2014.01)
    *H04N 19/103*      (2014.01)
    *H04N 19/176*      (2014.01)
(52) U.S. Cl.
    CPC ......... *H04N 19/136* (2014.11); *H04N 19/103* (2014.11); *H04N 19/176* (2014.11)
(58) Field of Classification Search
    None
    See application file for complete search history.

(56) References Cited

U.S. PATENT DOCUMENTS

2021/0201540 A1      7/2021   Zhang et al.
2022/0239946 A1*     7/2022   Park ...................... H04N 19/60

FOREIGN PATENT DOCUMENTS

| CN | 101547010 A | 9/2009 |
| CN | 111699683 A | 9/2020 |
| CN | 112565734 A | 3/2021 |
| CN | 112740702 A | 4/2021 |
| CN | 113284250 A | 8/2021 |
| CN | 114598892 A | 6/2022 |
| CN | 115396668 A | 11/2022 |

OTHER PUBLICATIONS

Chinese language Office Action issued in Chinese Application No. 202211003838.7 dated Mar. 27, 2025 with English translation ( 22 pages).
International Search Report issued in international application No. PCT/CN2023/106256, dated Oct. 11, 2023, 10 pages (with English translation)

* cited by examiner

*Primary Examiner* — Christopher G Findley
(74) *Attorney, Agent, or Firm* — Crowell & Moring LLP

(57)                ABSTRACT

The disclosure relates to methods and apparatuses for decoding and encoding point cloud data, which may be applied to scenes such as cloud technology, smart transportation, and assisted driving. The decoding method includes: obtaining encoded data of a data block in point cloud data, determining a target decoding parameter of the data block according to a target encoding parameter corresponding to the data block; and decoding the encoded data according to the target decoding parameter to obtain a decoded signal of the data block. The decoding efficiency of data blocks in point cloud data can be improved.

18 Claims, 6 Drawing Sheets

METHODS AND APPARATUSES FOR DECODING AND ENCODING POINT CLOUD DATA

RELATED APPLICATION

This application is a continuation application of PCT Patent Application No. PCT/CN2023/106256, filed on Jul. 7, 2023, which claims priority to Chinese Patent Application No. 2022110038387, entitled "Methods and Apparatuses for Decoding and Encoding Point Cloud Data, Storage Medium, and Device" filed to the China National Intellectual Property Administration on Aug. 19, 2022, wherein the content of the above-referenced applications is incorporated herein by reference in its entirety.

FIELD OF THE TECHNOLOGY

This disclosure relates to the field of data processing technologies, and in particular, to an encoding and decoding technology for point cloud data.

BACKGROUND OF THE DISCLOSURE

Point cloud data is a set of massive points obtained by scanning surface attributes of an object. A point or a group of points in point cloud data may be referred to as a data block in point cloud data. Each data block in the point cloud data generally includes geometric information, color, reflectivity, and other attributes of the object, and the order of magnitude of data blocks in the point cloud data is relatively large. It can be seen that the point cloud data includes a large amount of data. Therefore, it is necessary to code the attributes of the data block in the point cloud data to obtain a bit stream, and the transmission efficiency of the point cloud data can be improved by transmitting the bit stream.

However, in the process of decoding the bit stream of the data block in the point cloud data at a decoding end, there is a problem that the data size of the bit stream of the data block is large. A decoding device needs to spend a long time to receive and decode the bit stream of the data block, and the decoding efficiency is low.

SUMMARY

To address the technical problem, embodiments of this disclosure provide methods and apparatuses for decoding and encoding point cloud data, a storage medium, and a device, which can improve the decoding efficiency of data blocks of point cloud data.

According to an aspect of the embodiments of this disclosure, a method for decoding point cloud data is provided. The method is performed by a computer device and includes:

obtaining encoded data of a data block in point cloud data, the encoded data of the data block being obtained by encoding a signal in the data block according to a target encoding parameter, the target encoding parameter being an encoding parameter of the data block under an encoding mode of non-equal length encoding, and the target encoding parameter being determined based on a signal feature of the signal;

determining a target decoding parameter of the data block according to the target encoding parameter; and decoding the encoded data of the data block according to the target decoding parameter to obtain a decoded signal of the data block, the decoded signal being configured for reflecting a media attribute of the data block.

According to an aspect of the embodiments of this disclosure, a method for encoding point cloud data is provided. The method is performed by a computer device and includes:

obtaining a signal within a data block in point cloud data and a signal feature of the signal, an encoding mode of the point cloud data being an encoding mode of non-equal length encoding, and the signal being configured for reflecting a media attribute of the data block;

determining, according to the signal feature of the signal, a target encoding parameter of the data block under the encoding mode; and encoding the signal according to the target encoding parameter to obtain encoded data of the data block.

According to an aspect of the embodiments of this disclosure, an apparatus for decoding point cloud data is provided. The apparatus includes a memory operable to store computer-readable instructions and a processor circuitry operable to read the computer-readable instructions. When executing the computer-readable instructions, the processor circuitry is configured to:

obtain encoded data of a data block in point cloud data, the encoded data of the data block being obtained by encoding a signal in the data block according to a target encoding parameter, the target encoding parameter being an encoding parameter of the data block under an encoding mode of non-equal length encoding, and the target encoding parameter being determined based on a signal feature of the signal;

determine a target decoding parameter of the data block according to the target encoding parameter; and decode the encoded data of the data block according to the target decoding parameter to obtain a decoded signal of the data block, the decoded signal being configured for reflecting a media attribute of the data block.

In the embodiments of this disclosure, a data block in point cloud data may be used as a data block. Encoded data of the data block is obtained by encoding a signal in the data block according to a target encoding parameter. The target encoding parameter is an encoding parameter of the data block under an encoding mode of non-equal length encoding. The target encoding parameter is determined based on a signal feature of the signal. The encoded data of the data block herein is bits for describing the encoded data of the data block. To be specific, the encoded data of the data block is a length of the encoded data of the data block. In other words, it is adaptively determined how many codes (namely, bits) are required to describe the encoded data of the data block based on the signal feature of the signal within the data block. To be specific, data blocks having different signal features have different codes (namely, different bits). In this way, the redundancy of the encoded data of the data block can be effectively reduced, the length of the encoded data of the data block can be reduced, and the transmission efficiency of the encoded data of the data block can be improved. Further, after receiving the encoded data of the data block, a decoding device may decode the encoded data of the data block according to a target decoding parameter to obtain a decoded signal of the data block. The target decoding parameter is determined by the target encoding parameter. Because the redundancy of the encoded data of the data block is relatively low, the decoded signal of the data block can be quickly decoded, thereby improving the decoding efficiency.

BRIEF DESCRIPTION OF THE DRAWINGS

To describe the technical solutions in embodiments of the present disclosure or the related art more clearly, the following briefly describes the accompanying drawings required for describing the embodiments or the related art. It is clear that the accompanying drawings in the following descriptions show merely the embodiments of the present disclosure, and a person of ordinary skill in the art may still derive other drawings from the accompanying drawings without creative efforts.

DESCRIPTION OF EMBODIMENTS

The technical solutions in the embodiments of the present disclosure are clearly and completely described in the following with reference to the accompanying drawings in the embodiments of the present disclosure. It is clear that the described embodiments are merely some rather than all of the embodiments of the present disclosure. All other embodiments obtained by a person of ordinary skill in the art based on the embodiments of the present disclosure without creative efforts shall fall within the protection scope of the present disclosure.

This disclosure relates to the field of cloud technologies. This disclosure relates to cloud computing in the field of cloud technologies. Cloud computing is a computing mode, which distributes computing tasks on a resource pool composed of a large number of computers, so that various application systems can obtain computing power, storage space, and information services as required. A network that provides resources is referred to as a "cloud." The resources in the "cloud" are infinitely extensible in the eyes of users, and may be obtained at any time, used on demand, and extended at any time. In this disclosure, data blocks in a plurality of point cloud data may be coded and decoded by cloud computing.

Figure 1:
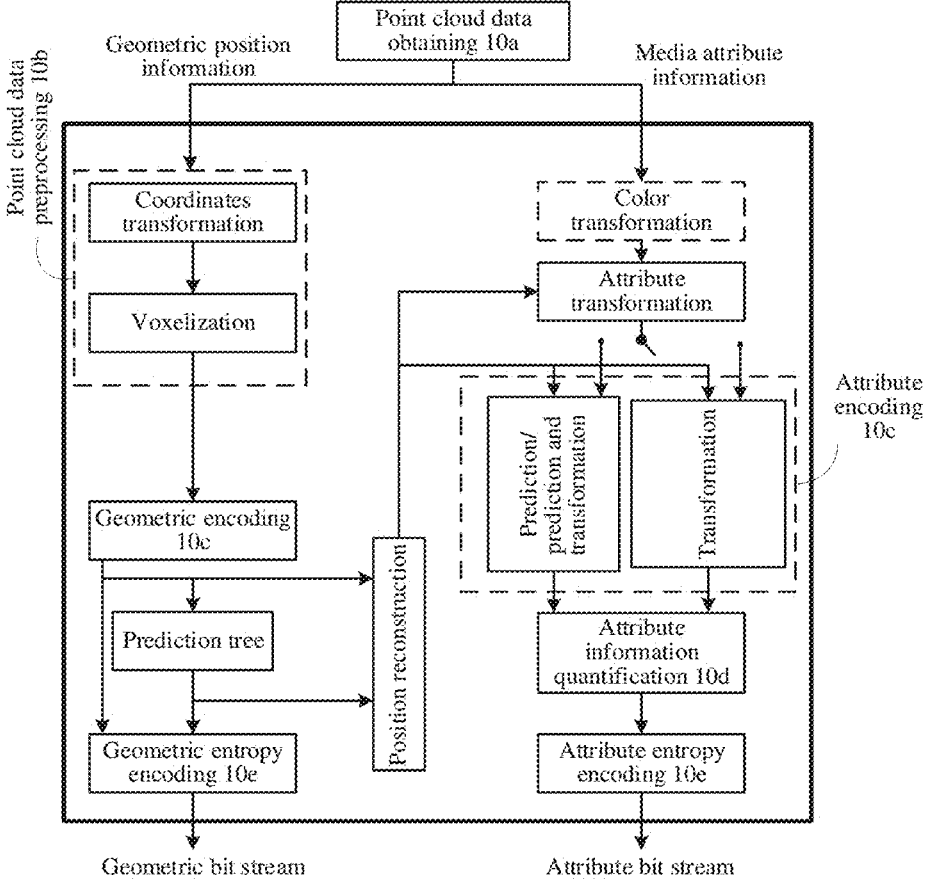
FIG. 1 is a schematic diagram of a point cloud data processing procedure according to embodiments of this disclosure.

The embodiments of this disclosure relate to a point cloud data processing technology. The embodiments of this disclosure mainly relate to point cloud datan encoding and point cloud data decoding, as shown in FIG. 1. FIG. 1 is a schematic diagram of point cloud data processing according to embodiments of this disclosure. The point cloud data processing procedure may be shown in FIG. 1, and may specifically include: point cloud data obtaining 10a, point cloud data preprocessing 10b, point cloud datan encoding 10c, point cloud data quantification 10d, point cloud data entropy encoding 10c, and point cloud data decoding.

Point Cloud Data: The point cloud data is a set of discrete points which represent spatial structures and surface attributes of three-dimensional (3D) objects or scenes with irregular distribution in space. Each data block in the point cloud data has at least geometric position information (namely, 3D position information), and may alternatively have color, material, or other media attribute information depending on application scenes. Generally, each data point in the point cloud data has the same amount of media attribute information, and one data point or a group of data points in the point cloud data in this disclosure may be referred to as a data block.

Point Cloud Data Obtaining 10a: Obtaining of point cloud data. The modes of obtaining the point cloud data include but are not limited to: computer generation, 3D laser scanning, 3D photogrammetry, and the like. A computer may generate point cloud data of virtual 3D objects and scenes. The 3D scanning may obtain point cloud data of static real-world 3D objects or scenes, and millions of points may be obtained per second. The 3D photogrammetry may obtain point cloud data of dynamic real-world 3D objects or scenes, and tens of millions of points may be obtained per second. With the continuous accumulation of large-scale point cloud data, the efficient storage, transmission, release, sharing, and standardization of point cloud data have become the key to point cloud applications.

Point Cloud Data Preprocessing 10b: Preprocessing of point cloud data in a 3D space, which includes coordinates transformation (Transform coordinates) and voxelization (VoxeLize). The coordinates transformation is the transformation of coordinates of points in the point cloud data into other different coordinates (such as world coordinates) by zooming and translating. The voxelization is coordinate quantization, duplicate point deletion, and attribute assignment of the points in the point cloud data, including: quantizing all points in the same voxel to a voxel center, and assigning the combination of attributes of all the points in the voxel to the voxel center, and determining the voxel center as a new point. In this way, through the operations of scaling and translating, the point cloud data in the 3D space is converted into an integer form, and a minimum geometric position thereof is moved to a coordinate origin.

Point Cloud Datan encoding 10c: Encoded data blocks in point cloud data, including geometric encoding and attribute encoding (for example, shown in FIG. 1). The geometric encoding is to code geometric position information of a point to obtain a geometric bit stream of the point. The geometric encoding may include the following two modes: (a) Octree-based geometric encoding: An octree is a tree-like data structure. In 3D space division, a bounding box of point clouds (namely, a minimum cube containing all point clouds) is evenly divided, and each node has eight child nodes. By using "1" and "0" to indicate the occupancy or not of each child node in the octree, an occupancy code is obtained, and the occupancy code is used as a bit stream of point cloud geometric information. (b) Trisoup-based geometric encoding: The point cloud is divided into blocks of a certain size, and intersection points on the surface of the point cloud at the edges of the blocks are located and a triangle is constructed. The bit stream of the point cloud geometric information is obtained by encoding the intersection points. The attribute encoding is to code media attribute information of a point to obtain an attribute bit stream of the point.

Point Cloud Data Quantification 10*d*: The geometric bit stream and attribute bit stream of the point are further subjected to a lossy quantization operation, and certain information is lost, so that the quantized bit streams are conducive to compression and expression. The point cloud data quantization may include geometric quantization and attribute quantization. For example, the geometric quantization is to quantize the bit stream of the point cloud geometric information, and to quantize encoding values within a certain value range into the same encoding value. The degree of refinement of quantization is generally determined by a quantization parameter (QP). A larger value of the QP indicates that coefficients within a larger range of values will be quantized into the same output. Therefore, more distortion and lower code rate will be brought generally. Conversely, a smaller value of the QP indicates that coefficients within a smaller range of values will be quantized into the same output. Therefore, less distortion will be brought generally while corresponding to a higher code rate. In the point cloud encoding, quantization is performed directly on coordinate information of points. The attribute information quantization (for example, attribute information quantization 10*d* in FIG. 1) is to quantize the attribute bit stream, and to quantize encoding values within a value range into the same encoding value. The degree of refinement of quantization is generally determined by the QP. In predictive encoding, attribute residuals are quantized. In transformation encoding, transformation coefficients are quantized.

Point cloud data entropy encoding 10*e* or statistical encoding: The quantized bit stream will be statistically compressed and coded according to the frequency of occurrence of each value, and finally a binary (0 or 1) compressed bit stream will be outputted. The entropy encoding includes geometric entropy encoding (for example, geometric entropy encoding 10*e* in FIG. 1) and attribute entropy encoding (for example, attribute entropy encoding 10*e* in FIG. 1). The geometric entropy encoding is statistical compression encoding of the bit stream of the point cloud geometric information, and finally a binary (0 or 1) compressed bit stream, such as the geometric bit stream, is outputted. The geometric entropy encoding is, for example, statistical compression encoding of the occupancy code of the octree. The statistical encoding is a lossless encoding mode, which can effectively reduce the code rate required to express the same signal. Context-based binary arithmetic encoding is a common statistical encoding mode. The attribute entropy encoding is the statistical compression of the quantized attribute residuals or transformation coefficients, and finally a binary (0 or 1) compressed bit stream, such as the attribute bit stream, is outputted. Generally, the quantized attribute residuals or transformation coefficients can be finally compressed by using run length encoding and arithmetic encoding. In the corresponding encoding mode, quantization parameters and other information are also coded by an entropy coder.

Point Cloud Data Decoding: At a decoding end, after a decoder obtains the compressed bit stream of the point cloud data, entropy decoding is firstly performed for the compressed code to obtain quantized geometric information and quantized attribute information. Firstly, position information of reconstructed points is obtained by inverse quantization of the geometric information. On the other hand, the quantized attribute information is inversely quantized to obtain attribute residuals, a reference signal is confirmed according to the adopted encoding mode, and reconstructed attribute information is obtained, which corresponds to the geometric information one by one in order to generate outputted reconstructed point cloud data.

Figure 2:
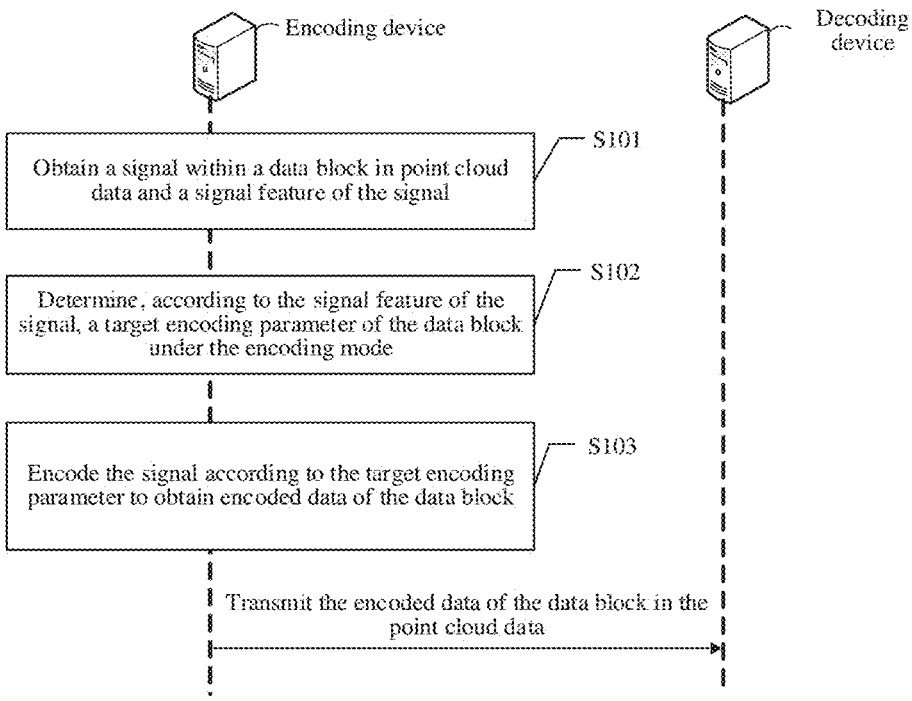
FIG. 2 is a schematic flowchart of a method for encoding point cloud data according to embodiments of this disclosure.

The data block in the embodiments of this disclosure may be a data point in the point cloud data, or may be a group of data points composed of at least two data points in the point cloud data. As shown in FIG. 2, FIG. 2 is a schematic flowchart of a method for encoding point cloud data according to embodiments of this disclosure. The method may be performed by a computer device. The computer device may be an encoding device. As shown in FIG. 2, the method may specifically include but is not limited to the following operations:

S101: Obtain a signal within a data block in point cloud data and a signal feature of the signal.

The point cloud data is widely used in the construction of urban digital maps, and plays a technical supporting role in many popular researches such as smart cities, unmanned driving, and cultural relics protection. The computer device may acquire a surface of an object through a 3D scanning device to obtain point cloud data. The point cloud data includes a plurality of data points. The data point may be a small region on the surface of the object. The data block may be any data point or a group of data points composed of at least two data points in the point cloud data. For example, the data block may be the point cloud data, a macro block in the point cloud data, or a prediction tree (tree composed of a plurality of data points in the point cloud data) in the point cloud data. The point cloud data may include one or more data blocks, and the data block is any data block in the one or more data blocks. The computer device may obtain a signal within the data block in the point cloud data. There may be one or more signals within the data block. The signal within the data block may be configured for reflecting a media attribute of the data block. The media attribute may be an attribute such as geometric position information, color, reflectivity, classification value, intensity value, time, material characteristic, and texture information. The signal may be obtained by performing attribute prediction, attribute transformation, attribute prediction transformation, or attribute transformation prediction on the media attribute of the data block, such as geometric prediction residuals, attribute prediction residuals, or attribute transformation coefficients. The computer device may obtain a signal feature of the signal. The signal feature may be a signal threshold range of the signal, a distribution feature of the signal, a signal value magnitude of the signal, or a signal feature of an associated signal associated with the signal of the data block.

The encoding mode of the point cloud data may be an encoding mode of non-equal length encoding. The encoding mode of non-equal length encoding may include an unsigned exponential Golomb encoding mode, a signed exponential Golomb encoding mode, a truncated exponential Golomb encoding mode, and a mapping exponential Golomb encoding mode. Because a machine can only recognize 0 and 1, it is necessary to code the signal of the data block into a character composed of 0 and 1. When the signal of the data block is coded in a binary mode, because the binary encoding is equal length encoding, to be specific, different to-be-encoded values are recorded in the same code (namely, bits), a large amount of redundant information will be generated. For example, when a signal value of the signal is 2, encoded data obtained by binary encoding is 00000010. The data that can be represented by only 2 bits is now represented by 8 bits, and therefore, the remaining 6 bits are redundant data. During network transmission, a large redundancy will be caused, which will increase the network burden. By encoding the signal of the data block in the encoding mode of non-equal length encoding, a data size of the encoded data of the data block can be reduced, so as to reduce the network burden and improve the transmission efficiency of the point cloud data. At the same time, a data size of a bit stream to be decoded by the decoding end can be reduced, so as to improve the encoding and decoding efficiency of the point cloud data. For example, when the signal value of the signal is 0, encoded data obtained by using a 0-order exponential Golomb encoding mode is 1, and there is only one bit, so that the number of bit bits and the amount of the encoded data can be greatly reduced.

In an implementation, the signal of the data block may be obtained by attribute prediction of the media attribute of the data block. The signal of the data block includes attribute prediction residuals corresponding to M media attributes of the data block. To be specific, one media attribute corresponds to one attribute prediction residual. For example, when one of the media attributes of the data block is a color attribute, the signal of the data block may be an attribute prediction residual corresponding to the color attribute. For example, when another media attribute of the data block is a reflectivity attribute, the signal of the data block may be an attribute prediction residual corresponding to the reflectivity attribute. The attribute prediction residual is obtained by differencing the media attribute of the data block and a prediction attribute of the data block. The prediction attribute of the data block may be obtained by predicting according to a media attribute of a reference data block of the data block. The attribute prediction residual is the signal of the data block. For example, when the media attribute of the data block is a color attribute, a color attribute prediction residual of the data block is obtained by differencing a color attribute of the reference data block of the data block and the color attribute of the data block. The reference data block of the data block may be a data block in the point cloud data, where a position distance from the data block to the data block is less than or equal to a distance threshold.

In an implementation, the signal of the data block may be obtained by attribute transformation of the media attribute of the data block. The signal of the data block may be obtained by attribute transformation of the media attribute of the data block using a transformation matrix. The transformation matrix is determined according to the number of data points in the data block. The computer device may obtain a corresponding transformation matrix from a transformation matrix set according to the number of data points in the data block. The computer device transforms the media attribute of the data block through the transformation matrix to obtain a first attribute transformation coefficient (namely, direct current component coefficient) and one or more second attribute transformation coefficients (namely, alternating current component coefficient). The first attribute transformation coefficient (namely, direct current component coefficient) and the one or more second attribute transformation coefficients (namely, alternating current component coefficient) are signals of the data block.

In an implementation, the signal of the data block may be obtained by attribute prediction transformation of the media attribute of the data block. The attribute prediction transformation is to perform attribute prediction processing on the media attribute of the data block to obtain an attribute prediction residual, and perform attribute transformation processing on the attribute prediction residual of the data block to obtain an attribute transformation coefficient of the data block. The attribute transformation coefficient of the data block is the signal of the data block.

In an implementation, the signal of the data block may be obtained by attribute transformation prediction of the media attribute of the data block. The attribute transformation prediction is to perform attribute transformation processing on the media attribute of the data block to obtain an attribute transformation coefficient of the data block, and to perform attribute prediction through the attribute transformation coefficient of the data block to obtain an attribute prediction residual of the data block. The attribute prediction residual of the data block is the signal of the data block.

A formula for the attribute prediction transformation may be as shown in the following formula (1):

$$Y = AX \qquad (1)$$

where X is the attribute prediction residual of the media attribute of the data block, Y is a first transformation coefficient and a second transformation coefficient corresponding to the media attribute of the data block, A is a $K\_i$-element discrete cosine transform (DCT) matrix, and i is the number of data points in the data block. For example, when the number of data points in the data block is 4, a quad-element DCT matrix is A={{256, 256, 256, 256}, {256, 256, −256, −256}, {256, −256, −256, 256}, {256, −256, 256, −256}}, X={−2, −3, −17, −16}, and Y={−9728, 7168, 512, 0}. Y(0)=−9728 is the first transformation coefficient, and the other three are the second transformation coefficients.

Figure 3:
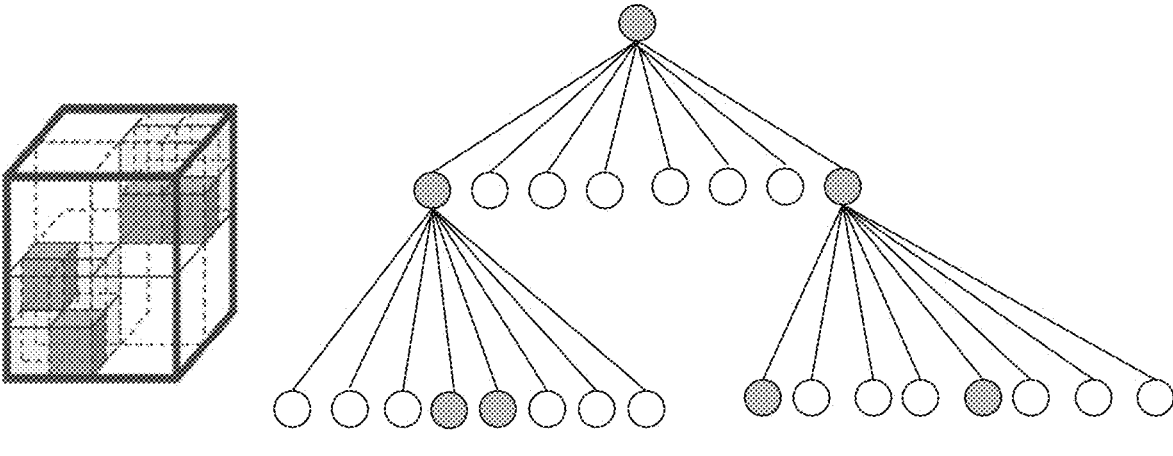
FIG. 3 is a schematic diagram of a data block according to embodiments of this disclosure.

As shown in FIG. 3, FIG. 3 is a schematic diagram of a data block according to embodiments of this disclosure. As shown in FIG. 3, a computer device may divide a 3D space composed of point cloud data by using an octree division mode to obtain data blocks in the point cloud data. The octree division mode is to evenly divide a bounding box of the point cloud data (namely, the 3D space composed of the point cloud data) layer by layer to obtain an octree of the point cloud data. Each node in the octree has eight child nodes. The data blocks in the point cloud data may be any nodes in the octree. To be specific, the data blocks in the point cloud data may be nodes in any layer of the octree. As shown in FIG. 3, the computer device may use "1" and "0" to indicate whether each child node in the octree is occupied or not, and obtain a bit stream of geometric information corresponding to the point cloud data. To be specific, the presence of a point in the point cloud data in the child node is represented by "1". The absence of a point in the point cloud data in the child node is represented by "0". As shown in FIG. 3, the computer device divides the bounding box of the point cloud data for the first time to obtain eight first child nodes of a first layer, which are coded into 10000001. The data blocks in the point cloud data may be the eight first child nodes of the first layer. If the first one of the first child nodes contains a data point in the point cloud data, occupancy information of the first one of the first child nodes is "1". If the second to seventh first child nodes do not contain a data point in the point cloud data, the occupancy information of the first one of the first child nodes is "0". If the eighth first child node contains a data point in the point cloud data, the occupancy information of the first one of the first child nodes is "1". By analogy, the first one of the first child nodes of a second layer includes eight second child nodes, the first one of the first child nodes is coded into 00011000, and the eighth first child node is coded into 10001000.

Similarly, the data blocks in the point cloud data may alternatively be second child nodes of the second layer.

S102: Determine, according to the signal feature of the signal, a target encoding parameter of the data block under the encoding mode.

The computer device may determine, according to the signal feature of the signal, a target encoding parameter of the data block under the encoding mode. The target encoding parameter includes a parameter for indicating a length of the encoded data of the data block. For example, when the encoding mode is an exponential Golomb encoding mode, the target encoding parameter may be an order based on the exponential Golomb encoding mode, such as one of order 0, order 1, and order 2. For example, when a signal value of the signal is 3, if the target encoding parameter is order 0, the target encoding parameter is configured for indicating that a first encoding length of the encoded data of the data block is 5 bits (to be specific, the encoded data of 3 is 00100). If the target encoding parameter is order 1, the target encoding parameter is configured for indicating that a first encoding length of the encoded data of the data block is 4 bits (to be specific, the encoded data of 3 is 0101). If the target encoding parameter is order 2, the target encoding parameter is configured for indicating that a first encoding length of the encoded data of the data block is 3 bits (to be specific, the encoded data of 3 is 111). The computer device may determine, according to the signal feature of the signal, a target encoding parameter of the data block under the encoding mode, so as to represent the encoded data of the data block with the least codes (namely, bits). The encoded data of the data block herein is bits for describing the encoded data of the data block. To be specific, the encoded data of the data block is a length of the encoded data of the data block. In other words, it is adaptively determined how many codes are required to describe the encoded data of the data block based on the signal feature of the signal within the data block. To be specific, data blocks having different signal features have different codes. In this way, the redundancy of the encoded data of the data block can be effectively reduced, the length of the encoded data of the data block can be reduced, and the transmission efficiency of the encoded data of the data block can be improved.

In an implementation, the computer device may determine, according to the signal value of the signal, a target encoding parameter corresponding to the data block. Specifically, the computer device obtains a signal range within which the signal falls, and determines a target encoding parameter corresponding to the data block from a signal range parameter table according to the signal range within which the signal falls. The signal range parameter table includes one or more signal ranges and encoding parameters corresponding to the one or more signal ranges respectively. For example, when the encoding mode is an exponential Golomb encoding mode, as the signal value of the signal of the data block is larger, a larger target encoding parameter (namely, order) may be adopted. As the signal value of the signal of the data block is smaller, a smaller target encoding parameter may be adopted. For example, when the signal value of the signal of the data block is "0", order 0 may be used as the target encoding parameter corresponding to the data block. To be specific, a signal within a target data block is coded by using an order-0 exponential Golomb encoding mode. When the signal value of the signal of the data block is "7", order 3 may be used as the target encoding parameter of the data block. It is clear that the target encoding parameter corresponding to the data block may be determined according to other signal features of the signal and encoding mode features of the encoding mode. The computer device may preset a signal range parameter table according to the signal value of the signal and encoding quantity information obtained by encoding different signal values with different encoding parameters of the exponential Golomb encoding mode. For example, when the signal value is 0, the target encoding parameter is 0, and the signal value 0 may be represented with the least codes. To be specific, the encoded data of the signal value 0 is 1. When the signal value is 1, the target encoding parameter is 1, and the signal value 1 may be represented with the least codes. To be specific, the encoded data of the signal value 1 is 11. When the signal value is 2, the target encoding parameter is 0 or 2, and the signal value 2 may be represented with the least codes. When the target encoding parameter is 0, the encoded data of the signal value 0 is 011. When the target encoding parameter is 2, the encoded data of the signal value 0 is 110. When there is a plurality of target encoding parameters, a parameter for encoding the data block may be randomly selected from the plurality of target encoding parameters, and a parameter for encoding the data block may be determined from the plurality of target encoding parameters according to other screening conditions (encoding parameters of adjacent data blocks corresponding to the data block, a group within which the data block falls, and other conditions).

In an implementation, the signal feature of the signal includes a signal range value of the signal. The signal range value is determined based on a maximum signal and a minimum signal within the data block. Or, the signal range value is determined based on a sampling precision of the signal within the data block.

If the signal range value is determined based on a maximum signal and a minimum signal within the data block, In an implementation, the signal range value may be a difference between a signal value of the maximum signal and a signal value of the minimum signal within the data block. For example, when the signal of the data block is a geometric prediction residual, the signal range value may be a difference between a maximum geometric prediction residual and a minimum geometric prediction residual. For example, if the signal value of the maximum signal within the data block is 6 and the signal value of the minimum signal is 0, the signal range value of the signal within the data block is 6. Or, the signal range value of the signal may be determined based on a sampling precision of the signal within the data block. For example, if a geometric precision of the point cloud data is 10 bits, a sampling precision of the signal within the data block in the point cloud data may be 10 bits, and the signal range value of the signal of the data block may be 210.

In an implementation, the specific mode in which the computer device determines a target encoding parameter of the data block under the encoding mode may include: generating, according to the signal range value in the signal feature, an index value corresponding to the data block; and querying, from a second parameter table, an encoding parameter associated with the index value, where the second parameter table includes at least one index value and an encoding parameter associated with each index value in the at least one index value, and one index value corresponds to one encoding parameter. The computer device may determine the queried encoding parameter as the target encoding parameter of the data block under the encoding mode. The computer device may preset the second parameter table according to the signal range value. For example, the computer device may preset the second parameter table according to the difference between the maximum signal and the minimum signal. The computer device may alternatively preset the second parameter table according to a maximum sampling precision of the point cloud data, for example, determine a range of index values of the second parameter table (to be specific, determine a length of the second parameter table) according to the maximum sampling precision of the point cloud data, and determine an encoding parameter corresponding to each index value.

In an implementation, the specific mode in which the computer device generates an index value corresponding to the data block may include: quantizing the signal range value in the signal feature to obtain a quantized signal range value; and obtaining a logarithmic value of the quantized signal range value, and differencing the obtained logarithmic value to obtain an index value corresponding to the data block.

In an implementation, the computer device may obtain a quantization step. The quantization step may be preset by a manager or may be determined according to a signal range of the signal. The computer device may quantize, based on the quantization step, the signal range value in the signal feature of the signal to obtain a quantized signal range value. By quantizing the signal range value, the signal range value falling within the target range may be replaced with a target signal range value to compress data, so as to be convenient to quickly query the index value corresponding to the data block. Further, the computer device may obtain a logarithmic value of the quantized signal range value, and difference the logarithmic value to obtain an index value corresponding to the data block.

The index value corresponding to the data block, which is generated by the computer device, may be obtained according to the following formula (2):

$$\text{Index} = \log_2 B' - 1 \qquad (2)$$

where Index is the index value corresponding to the data block, and B' is the quantized signal range value.

After the computer device obtains the index value corresponding to the data block, the target encoding parameter corresponding to the data block may be queried from the second parameter table based on a formula GolombNum=$\text{LUT}_{kthIndex}$[Index], where Index is the index value corresponding to the data block, GolombNum is the target encoding parameter corresponding to the data block, and LUT indicates that the encoding parameter corresponding to the index value is queried from the second parameter table.

In an implementation, the point cloud data includes at least two data groups. The data block falls within a first data group in the at least two data groups. The number of index values in the second parameter table is the same as the number of data blocks in the first data group. For example, if the number of data blocks in the first data group is 8, the second parameter table may be a parameter table including eight index values in a parameter table set. In this way, it is convenient to query the encoding parameter corresponding to each data block in the first data group from the second parameter table. The index value falls within an index value range, and the index value range is determined according to the at least one index value in the second parameter table. When the number of index values is large, the index values may be divided into different index value ranges, and one index value range corresponds to one parameter table. In this way, the computer device may determine the index value range within which the index value falls, and query the encoding parameter corresponding to the index value from the second parameter table corresponding to the index value range, thereby avoiding one-to-one comparison of all index values, and reducing the amount of query data. The computer device may adjust the encoding parameters according to groups, for example, adaptively adjust the encoding parameters of the data blocks in the same group, or not adjust the encoding parameters of the data blocks in the same group.

In an implementation, when there is one signal, the computer device may determine, according to the signal value of the signal, a target encoding parameter corresponding to the data block. Or, the computer device may determine a target encoding parameter of the data block according to data blocks (such as positionally adjacent data blocks or other data blocks in a data group in which the data block is located) associated with the data block. In an implementation, when there is a plurality of signals of the data block, the computer device may determine, according to a difference between a maximum signal and a minimum signal in the data block, a target encoding parameter corresponding to the data block. Or, the computer device may determine, according to a signal value of the maximum signal in the data block, a target encoding parameter corresponding to the data block. Or, the computer device may determine, according to a signal mean of all the signals within the data block, a target encoding parameter corresponding to the data block. It is clear that the computer device may determine, according to data blocks associated with the data block, a target encoding parameter corresponding to the data block. A target encoding parameter corresponding to a target encoded data block may be defaulted by an encoding device for encoding the point cloud data and a decoding device for decoding the encoded data corresponding to the point cloud data, for example, determined by the encoding device and the decoding device according to historical encoding and decoding records of the point cloud data.

In an implementation, the specific mode in which the computer device determines a target encoding parameter corresponding to the data block may include: determining, according to the signal feature of the signal, an initial encoding parameter of the data block under the encoding mode; obtaining a coded data block having an adjacent relationship with the data block in the point cloud data; and adjusting, according to encoded data of the coded data block, the initial encoding parameter to obtain the target encoding parameter.

The specific mode in which the computer device determines an initial encoding parameter may be referred to the above-mentioned mode of determining the encoding parameter based on the signal feature of the signal within the data block. Details are not described herein again in the embodiments of this disclosure. Further, the computer device may obtain a coded data block having an adjacent relationship with the data block in the point cloud data. The coded data block having an adjacent relationship with the data block may be a coded data block positionally adjacent to the data block in the point cloud data. Or, the coded data block may be a coded data block coded in an order adjacent to the data block. Or, the coded data block may be a data block, in at least two data groups included in the point cloud data, in a second data group adjacent to a first data group in which the data block is located. The computer device may adjust, according to encoded data of the coded data block, the initial encoding parameter to obtain the target encoding parameter.

In this way, when the encoding parameter determined by the computer device according to the signal feature of the signal is used as the initial encoding parameter corresponding to the data block, the initial encoding parameter corresponding to the data block is adjusted according to the encoded data of the coded data block to obtain the target encoding parameter of the data block, thereby improving the accuracy of the target encoding parameter, so as to better represent the encoded data of the data block with less codes, and to reduce the data size of the encoded data.

In an implementation, the encoding mode may be an exponential Golomb encoding mode. The initial encoding parameter of the data block is an initial order. The specific mode in which the computer device adjusts the initial encoding parameter may include: determining a final encoding value of the encoded data of the coded data block; determining a first limiting order and a second limiting order according to the initial order, where the first limiting order is less than the second limiting order; obtaining a magnitude relationship between the final encoding value and the first and second limiting orders, and adjusting the initial order according to the magnitude relationship to obtain a target order associated with the data block; and determining the target order as the target encoding parameter.

Specifically, there may be one or n1 coded data blocks. When there is one coded data block and there is one signal within the coded data block, a final encoding value of encoded data of the coded data block may be a signal value corresponding to the signal within the coded data block. When there is one coded data block and there are n1 signals within the coded data block, a final encoding value of encoded data of the coded data block may be a mean of signal values corresponding to the n1 signals within the coded data block. When there are n1 coded data blocks, a final encoding value of encoded data of the coded data blocks may be a mean of the encoded data of the n1 coded data blocks. The computer device may determine a first limiting order and a second limiting order according to the initial order, where the first limiting order is less than the second limiting order. The computer device may be provided with a buffer for storing coded values. The buffer size is n1, and the final encoding value of the coded data block is counted every n2 points. The coded data block may be a data point in the point cloud data, and the initial order may be adjusted every n1 data points.

In general, the first limiting order is a lower limiting order, the second limiting order may be an upper limiting order. The initial order is represented by golombNum, the first limiting order is represented by golombNumLow, and the second limiting order is represented by golombNumUP. In an implementation, the mode in which the computer device determines a first limiting order and a second limiting order according to the initial order may include, but is not limited to, the following modes: Mode 1: golombNumLow=2^golombNum, golombNumUp=2^(golombNum+1). Mode 2: golombNumLow=2^(golombNum−1), golombNumUp=2^golombNum. Mode 3: golombNumUp=2^((golombNum−1))+2^((golombNum−2)); golombNumLow=2^((golombNum−1))−2^((golombNum−2)). In addition to the above-mentioned modes, the first limiting order and the second limiting order may be determined in other modes according to specific situations. Details are not described herein again in the embodiments of this disclosure.

The computer device may obtain a magnitude relationship between the final encoding value and the first and second limiting orders. The magnitude relationship may include that the final encoding value is less than the first limiting order, or that the final encoding value is greater than the second limiting order, or that the final encoding value is greater than or equal to the first limiting order and less than or equal to the second limiting order. The computer device may adjust the initial order according to the magnitude relationship to obtain a target order associated with the data block. The computer device may determine the target order as the target encoding parameter. In this way, the initial order is adjusted to obtain a more accurate target order. By encoding the signal within the data block with the target order, the signal may be represented with less codes, so as to reduce the data size of the encoded data corresponding to the data block, thereby improving the encoding and decoding efficiency.

In an implementation, the specific mode in which the computer device adjusts the initial order may include, but is not limited to, the following modes: determining, if the magnitude relationship indicates that the final encoding value is less than the first limiting order, a sum of the initial order and a first adjustment step as the target order; determining, if the magnitude relationship indicates that the final encoding value is greater than the second limiting order, a difference between the initial order and the first adjustment step as the target order; and determining, if the magnitude relationship indicates that the final encoding value is greater than or equal to the first limiting order and is less than or equal to the second limiting order, the initial order as the target order.

If the computer device determines that the magnitude relationship indicates that the final encoding value is less than the first limiting order, the computer device may determine a sum of the initial order and a first adjustment step as the target order. The first adjustment step may be determined by historical encoding record information, or the first adjustment step may be determined by a manager. The first adjustment step may be a value of 1, 2, 3, or the like. If the magnitude relationship indicates that the final encoding value is greater than the second limiting order, the computer device may determine a difference between the initial order and the first adjustment step as the target order. If the magnitude relationship indicates that the final encoding value is greater than or equal to the first limiting order and is less than or equal to the second limiting order, initial order is not adjusted, and the initial order is determined as the target order. In this way, the target order associated with the data block may be limited to a reasonable order range, and the accuracy of the target order can also be improved, so as to represent the encoded data of the data block with less codes.

In an implementation, the mode in which the computer device adjusts the initial order may include, but is not limited to, the following modes: obtaining an encoding parameter corresponding to the coded data block, where the encoding parameter of the coded data block includes a historical order of the coded data block; determining, if the magnitude relationship indicates that the final encoding value is less than the first limiting order, a sum of the historical order and a second adjustment step as the target order; determining, if the magnitude relationship indicates that the final encoding value is greater than the second limiting order, a difference between the historical order and the second adjustment step as the target order; and determining, if the magnitude relationship indicates that the final encoding value is greater than or equal to the first limiting order and is less than or equal to the second limiting order, the initial order as the target order.

The computer device may obtain an encoding parameter corresponding to the coded data block. If the magnitude relationship indicates that the final encoding value is less than the first limiting order, a sum of the historical order and a second adjustment step is determined as the target order. The second adjustment step may be the same as the first adjustment step or may be different from the first adjustment step. Similarly, the second adjustment step may alternatively be determined by historical encoding record information, or the second adjustment step may be determined by a manager. The second adjustment step may be a value of 1, 2, 3, or the like. If the magnitude relationship indicates that the final encoding value is greater than the second limiting order, a difference between the historical order and the second adjustment step is determined as the target order. If the magnitude relationship indicates that the final encoding value is greater than or equal to the first limiting order and is less than or equal to the second limiting order, the initial order is determined as the target order. In this way, the target order associated with the data block may be limited to a reasonable order range, and the accuracy of the target order can also be improved, so as to represent the encoded data of the data block with less codes.

In an implementation, the specific mode in which the computer device adjusts the initial order may include, but is not limited to, the following modes: adjusting the initial order according to the magnitude relationship to obtain a candidate order associated with the data block; determining, if the candidate order is less than or equal to a third limiting order, a sum of the candidate order and a third adjustment step as the target order; determining, if the candidate order is greater than or equal to a fourth limiting order, a difference between the candidate order and the third adjustment step as the target order, where the third limiting order is less than the fourth limiting order; and determining, if the candidate order is greater than the third limiting order and less than the fourth limiting order, the candidate order as the target order associated with the data block.

Specifically, the computer device may adjust the initial order according to the magnitude relationship to obtain a candidate order associated with the data block. The specific process of adjusting the initial order may be referred to the above-mentioned process of adjusting the initial order. The computer device may detect a relationship between the candidate order associated with the data block and the third and fourth limiting orders, and adjust the candidate order according to the relationship to obtain the target order associated with the data block. The third limiting order and the fourth limiting order are configured for limiting the target order within a reasonable order range. The third limiting order is less than the fourth limiting order. Specifically, if the candidate order is less than or equal to the third limiting order, a magnitude of the candidate order may be determined, and a sum of the candidate order and the third adjustment step may be determined as the target order. Or, if the candidate order is less than or equal to the third limiting order, a first preset order may be used as the target order. The first preset order is greater than the third limiting order and less than the fourth limiting order. To be specific, the first preset order is within a reasonable order range. If the candidate order is greater than or equal to the fourth limiting order, a difference between the candidate order and the third adjustment step may be determined as the target order. Or, if the candidate order is greater than the fourth limiting order, a second preset order may be determined as the target order. The second preset order is greater than the third limiting order and less than the fourth limiting order. To be specific, the second preset order is within a reasonable order range. If the candidate order is greater than the third limiting order and less than the fourth limiting order, it is indicated that the candidate order is within a reasonable order range, the candidate order is not adjusted, and the candidate order is determined as the target order.

In an implementation, the final encoding value may be a mean of all encoding values in the encoded data of the coded data block. Or, the final encoding value may be a mean of non-zero encoding values in the encoded data of the coded data block.

In an implementation, the computer device may obtain a signal within a coded data block and an encoding parameter of the coded data block. The encoding parameter of the coded data block may be determined based on a signal feature of the signal within the coded data block, or the encoding parameter of the coded data block may be determined based on a data block associated with the coded data block. The computer device may detect a signal magnitude relationship between the signal within the data block and the signal within the coded data block, and determine an encoding parameter of the data block according to the signal magnitude relationship and the encoding parameter of the coded data block. Specifically, if the signal within the data block is equal to the signal within the coded data block, the encoding parameter of the coded data block may be determined as the target encoding parameter. If the signal within the data block is less than the signal within the coded data block, a difference between the encoding parameter of the coded data block and the fourth adjustment step may be determined as the target encoding parameter. If the signal within the data block is greater than the signal within the coded data block, a sum of the encoding parameter of the coded data block and the fourth adjustment step may be determined as the target encoding parameter. Similarly, the fourth adjustment step may be determined by historical encoding record information, or the fourth adjustment step may be determined by a manager. The fourth adjustment step may be a value of 1, 2, 3, or the like.

In an implementation, the point cloud data includes at least two data groups. The data block falls within a first data group in the at least two data groups. Data blocks within the first data group correspond to the same encoding parameters. To be specific, encoding parameters corresponding to the data blocks within the first data group are the target encoding parameter. The coded data block falls within a second data group in the at least two data groups, which has an adjacent relationship with the first data group. Because media attributes of the data blocks located within the same data group have great similarity, the data blocks in the same data group may adopt the same encoding parameters. It is clear that the data blocks in the same data group may adopt different encoding parameters.

In an implementation, the computer device may group the data blocks in the point cloud data to obtain at least two data groups. The specific mode in which the computer device groups the point cloud data may include, but is not limited to, the following modes: Mode 1: The at least two data groups are grouped according to positions of data blocks in the point cloud data. The computer device may divide, according to the positions of the data blocks in the point cloud data, the data blocks in adjacent positions into a data group, so as to obtain at least two data groups in the point cloud data.

Mode 2: The at least two data groups are grouped according to Hilbert transformation codes corresponding to data blocks in the point cloud data. The corresponding Hilbert transformation codes of the data blocks in the point cloud data are obtained by performing Hilbert transformation on the position of each data block in the point cloud data. The computer device may perform Hilbert transformation on the position, in the point cloud data, of each data block in the point cloud data to obtain a Hilbert code corresponding to each data block. According to the Hilbert code corresponding to each data block, the data blocks in the point cloud data are sorted to obtain sorted data blocks. Further, the computer device may sequentially group the sorted data blocks based on an order of a space filling curve, and classify the data blocks with the same first L Hilbert codes into a data group. Specifically, the computer device may alternatively classify the data blocks with the same first L Hilbert codes into a data group to obtain a candidate data group. If the number of data blocks in the candidate data group is more than a limiting number, the candidate data group may be subdivided to limit the number of data blocks in the candidate data group within a limited data size. The candidate data group may alternatively be adjusted according to the number of data blocks contained in the preceding group to obtain a data group.

Mode 3: The at least two data groups are obtained by dividing the point cloud data according to a division size. The computer device may divide a 3D space composed of the point cloud data into $(2^{d_x}, 2^{d_y}, 2^{d_z})$-sized non-overlapping encoding macro-blocks, and each encoding macro-block may be a data group as a basic encoding unit, where x, y, z are coordinate information, and d is an octree division depth. A division size (such as the octree division depth d or a parameter) may be set for the computer device to control the magnitude of the data block.

Mode 4: The at least two data groups are obtained by dividing the point cloud data according to a specific limiting number and an encoding order of the data blocks. The computer device may sequentially group the data blocks in the point cloud data according to the specific limiting number and the encoding order of the data blocks in the point cloud data, so as to obtain at least two data groups. For example, the encoding order of five data blocks in the point cloud data is: data block s1, data block s2, data block s3, data block s4, and data block s5. If the specific limiting number is 2, one data group is: data block s1 and data block s2. Another data group is: data block s3 and data block s4. Still another data group is: data block s5. Or, the at least two data groups may be prediction tree units in a prediction tree generated according to the point cloud data. The prediction tree units may be units composed of a plurality of prediction tree nodes in the prediction tree.

Figure 4:
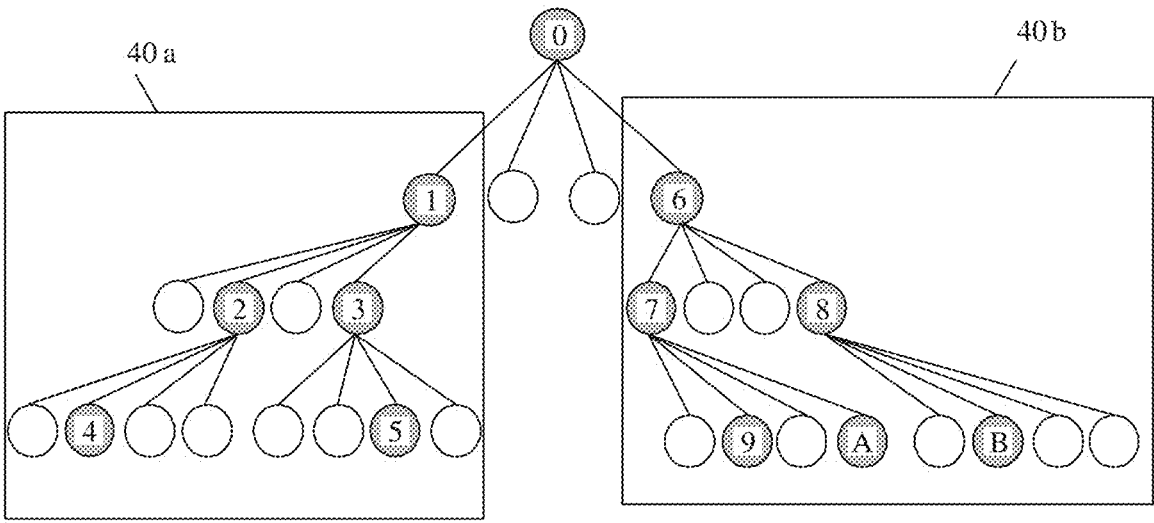
FIG. 4 is a schematic diagram of data grouping according to embodiments of this disclosure.

As shown in FIG. 4, FIG. 4 is a schematic diagram of data grouping according to embodiments of this disclosure. As shown in FIG. 4, the computer device may divide a 3D space composed of point cloud data into $(2^{d_x}, 2^{d_y}, 2^{d_z})$-sized non-overlapping encoding macro-blocks. As shown in FIG. 4, the computer device may evenly divide the 3D space composed of the point cloud data into four non-overlapping encoding macro-blocks. One encoding macro-block corresponds to one data group. Each data group may include four data blocks. As shown in FIG. 4, a data group 40a includes four data blocks. Each data block includes four data points. The data group 40a includes data points in the point cloud data. A second data block 2 includes a data point 4, and a third data block 3 includes a data point 5 in the data group. A data group 40b also includes four data blocks. Each data block includes four data points. The data group 40b includes data points in the point cloud data. A first data block 7 in the data group includes a data point 9 and a data point A, and a fourth data block 8 includes a data point B.

In an implementation, the signal of the data block may include one or more of a geometric prediction residual, an attribute prediction residual, and an attribute transformation coefficient. A geometric prediction residual of a data block coded first in the point cloud data may be a difference between a preset geometric position and a geometric position of the first data block, or the geometric position of the first data block. A geometric prediction residual of another data block in the point cloud data may be a difference between a geometric position of a data block coded ahead of the current data block and a geometric position of the current data block. The another data block is a data block other than the first data block in the point cloud data. An attribute prediction residual of the first data block may be a difference between a preset attribute and a media attribute of the first data block, or the media attribute of the first data block. An attribute prediction residual of another data block in the point cloud data may be a difference between a media attribute of a data block coded ahead of the current data block and a media attribute of the current data block. The attribute transformation coefficient is obtained by using a transformation matrix to transform the media attributes of the data blocks.

In an implementation, the signal includes a first signal and a second signal. The first signal has a different attribute type from the second signal. For example, the attribute type of the first signal may be a geometric position, and the attribute type of the second signal may be a color attribute. The target encoding parameter of the data block includes a first encoding parameter and a second encoding parameter. The first encoding parameter is configured for encoding the first signal, and the second encoding parameter is configured for encoding the second signal. The first encoding parameter is different from the second encoding parameter. The signals with different attribute types within the data block are coded with different encoding parameters. In this way, different encoding parameters may be determined according to the signals with different attribute types, so as to determine more accurate encoding parameters, thereby representing the encoded data of the data block with less codes.

In an implementation, the first signal includes a first sub-encoding signal, a second sub-encoding signal, and a third sub-encoding signal. The first encoding parameter may be determined based on sub-signal features corresponding to the first sub-encoding signal, the second sub-encoding signal, and the third sub-encoding signal, respectively. For example, the first encoding parameter may be determined based on a maximum sub-encoding signal among the first sub-encoding signal, the second sub-encoding signal, and the third sub-encoding signal. It is clear that the first encoding parameter may be determined based on a mean signal value of the first sub-encoding signal, the second sub-encoding signal, and the third sub-encoding signal. In an implementation, the first encoding parameter may be determined based on any one of the first sub-encoding signal, the second sub-encoding signal, and the third sub-encoding signal. Encoding parameters corresponding to the first sub-encoding signal, the second sub-encoding signal, and the third sub-encoding signal, respectively, may be determined as the first encoding parameter. In an implementation, the sub-encoding signals under the same attribute type may all adopt the same encoding parameters. In this case, an encoding parameter corresponding to associated information associated with the first signal may be determined as the first encoding parameter. For example, a run length of a zero value obtained by run length encoding of the first signal using run length encoding and a non-zero signal value may be coded by using the same first encoding parameter (namely, the first encoding parameter corresponding to the first signal). The run length encoding is to replace a continuous string of the same value with a representative value and a string length. For example, when the first signal is aaaabaaaa, 4b4 may be obtained by using the run length encoding. When the first signal is coded, a run length "4" and a non-zero signal value "b" may be coded by exponential Golomb encoding using the first encoding parameter corresponding to the first signal.

In an implementation, the first signal includes a first sub-encoding signal, a second sub-encoding signal, and a third sub-encoding signal. The first encoding parameter includes a first sub-encoding parameter corresponding to the first sub-encoding signal, a second sub-encoding parameter corresponding to the second sub-encoding signal, and a third sub-encoding parameter corresponding to the third sub-encoding signal. Different sub-encoding signals in the first signal adopt different encoding parameters. In this way, the encoding parameters corresponding to different sub-encoding signals may be determined according to the signal features of different sub-encoding signals, so as to determine more accurate encoding parameters, thereby representing the encoded data of the data block with less codes. The computer device may adjust the encoding parameters of the sub-encoding signals in the first signal by using an offset function. The offset function is a reference frame based on a specified reference, and a new reference is obtained by a given offset. The first sub-encoding parameter may be determined based on a sub-signal feature corresponding to the first sub-encoding signal. The second sub-encoding parameter may be determined based on the first sub-encoding parameter and a parameter offset. The third sub-encoding parameter may be determined based on the second sub-encoding parameter and the parameter offset. The parameter offset may be set by a manager, may be determined by historical encoding and decoding record information, and may be set according to specific situations. Details are not described herein again in the embodiments of this disclosure. It is clear that the encoding parameters within the signals with different attribute types may be adjusted by the offset function. For example, the first encoding parameter of the first signal is determined based on the signal feature of the first signal, and the encoding parameter of the second signal is determined based on a given offset and the encoding parameter of the first signal. Or, the encoding parameters corresponding to the first sub-encoding signal, the second sub-encoding signal, and the third sub-encoding signal respectively may be determined based on sub-signal features corresponding to the first sub-encoding signal, the second sub-encoding signal, and the third sub-encoding signal, respectively.

S103: Code the signal according to the target encoding parameter to obtain encoded data of the data block.

The computer device may code the signal within the data block according to the target encoding parameter to obtain encoded data of the data block. The signal within the data block may be coded by using an exponential Golomb encoding mode according to the target encoding parameter. When different encoding parameters are configured for encoding the signal within the data block, the encoded data of the data block falls within encoding lengths corresponding to different encoding parameters. For example, when an encoding parameter r1 is configured for encoding the signal within the data block, the obtained encoded data of the data block falls within an encoding description range corresponding to the encoding parameter r1. When an encoding parameter r2 is configured for encoding the signal within the data block, the obtained encoded data of the data block falls within an encoding description range corresponding to the encoding parameter r2. In this way, the signal within the data block is coded by using the target encoding parameter, thereby representing the signal within the data block with less codes, so as to reduce the data size of the encoded data. The encoded data obtained by encoding the signal within the data block using the target encoding parameter is less than the encoded data obtained by encoding the signal within the data block using other encoding parameters. Because the redundancy of the encoded data of the data block is relatively low, a decoded signal of the data block may be quickly decoded, thereby improving the decoding efficiency.

In an implementation, the computer device may directly code, after obtaining the target encoding parameter corresponding to the data block, the signal within the data block according to the target encoding parameter to obtain encoded data of the data block.

In an implementation, the specific mode in which the computer device codes the signal within the data block may include: generating, if the signal within the data block is different from a signal threshold, a first encoding flag, where the first encoding flag is configured for indicating that the signal within the data block is different from the signal threshold; differencing the signal within the data block according to the signal threshold to obtain a signal difference; and encoding the signal difference according to the target encoding parameter to obtain a signal encoding value of the signal, and determining the signal encoding value and the first encoding flag as the encoded data of the data block.

The computer device may detect whether the signal within the data block is the same as the signal threshold. When the signal within the data block is the same as the signal threshold, a second encoding flag is used as the encoded data of the data block. When the signal within the data block is different from the signal threshold, the signal within the data block is coded according to the first encoding flag and the target encoding parameter. The signal threshold may be a signal value of a signal which appears most frequently among the signals within the data block, or the signal threshold may be a signal value of a signal which appears most frequently in the point cloud data or may be set according to other specific situations. The first encoding flag is configured for indicating that the signal within the data block is different from the signal threshold. During decoding, the decoding device may decode the encoded data of the data block according to the first encoding flag and a target decoding parameter (namely, the target encoding parameter) to obtain a decoded signal of the data block (a signal value of the decoded signal is the same as the signal value of the signal).

Specifically, the computer device may determine, when determining that the signal within the data block is the same as the signal threshold, a second encoding flag as encoded data of the signal. The second encoding flag is configured for indicating that the signal within the data block is the same as the signal threshold. In this way, when the signal within the data block is the same as the signal threshold, the second encoding flag is used as the encoded data of the signal, and the data block is coded according to the first encoding flag and the target encoding parameter only when the signal within the data block is different from the signal threshold. In this way, when there are a large number of signals adjacent to the signal threshold among the signals of the data block, the second encoding flag may be directly used as the encoded data of the signals which are the same as the signal threshold, so that the number of signals to be coded can be reduced, and the encoding efficiency can be improved. For example, when the data block includes five signals, a signal value of the first signal is 1, a signal value of the second signal is 0, a signal value of the third signal is 1, a signal value of the fourth signal is 1, and a signal value of the fifth signal is 2, the signal threshold may be 1, the first encoding flag may be flag/1, and the second encoding flag may be flag=1. In this way, if the first signal is the same as the signal threshold, and the second encoding flag flag=1 may be used as the encoded data corresponding to the first signal. In this way, the signal value of the first signal may be directly determined as 1 according to the second encoding flag flag=1 during decoding. If the second signal is different from the signal threshold, the second signal may be coded according to the first encoding flag flag≠1 and the target encoding parameter. If the third signal is the same as the signal threshold, the encoded data of the third signal is the second encoding flag. If the fourth signal is the same as the signal threshold, the encoded data of the fourth signal is the second encoding flag. If the fifth signal is different from the signal threshold, the second signal may be coded according to the first encoding flag flag1 and the target encoding parameter.

In an implementation, when the signal within the data block is different from the signal threshold, the computer device may directly code the signal within the data block according to the target encoding parameter corresponding to the data block to obtain encoded data corresponding to the data block. During decoding, the decoding device may directly decode the encoded data corresponding to the data block according to the target decoding parameter (namely, target encoding parameter) to obtain a decoded signal of the data block.

When determining that the signal within the data block is different from the signal threshold, the computer device may generate a first encoding flag for indicating that the signal within the data block is different from the signal threshold, and difference the signal within the data block according to the signal threshold to obtain a signal difference. The computer device may obtain a difference between the signal within the data block and the signal threshold as the signal difference. The computer device may alternatively obtain a difference between the signal within the data block and the signal threshold and a first threshold as the signal difference. Specifically, the computer device may obtain a candidate difference between the signal within the data block and the signal threshold and then obtain a difference between the candidate difference and the first threshold as the signal difference. The first threshold may be set according to actual situations. For example, the first threshold may be 1 or another threshold. When the first threshold is 1, the signal difference is equal to a difference between the signal value of the signal and (m+1), where m is the signal threshold.

The computer device may code the signal difference according to the target encoding parameter to obtain a signal encoding value of the signal, and determine the signal encoding value of the signal and the first encoding flag as the encoded data of the signal. For example, if the signal within the data block is 3, the signal threshold is 2, and the first threshold is 1, the computer device obtains a difference between the signal value of the signal and the signal threshold and the first threshold as the signal difference. To be specific, the signal difference is 3-2-1=0. The computer device may directly code the signal difference 0, thereby reducing the data size of the encoded data. In this way, when determining that the signal within the data block is different from the signal threshold, the computer device may difference the signal within the data block, and code the signal difference obtained by differencing, thereby reducing the signal value of the signal to be coded. In this way, because less encoded data is obtained by encoding a smaller signal value, the data size of the encoded data can be reduced by encoding the signal difference corresponding to the signal, so as to improve the encoding and decoding efficiency. When decoding the encoded data of the signal, the decoding device may decode the encoded data of the signal according to the target decoding parameter (the target decoding parameter is the same as the target encoding parameter) to obtain a signal encoding value of the signal, and sum the signal encoding value of the signal according to the signal threshold to obtain a decoded signal of the signal.

In an implementation, the computer device may sequentially detect whether the signals within the data block are the same as the signal threshold and whether the signals are the same as positive integers less than the signal threshold, and generate corresponding encoding flags to indicate the signal values of the signals within the data block. For example, when the signal threshold is 2, the computer device may detect whether the signal within the data block is the same as threshold 2. If yes, the encoding flag of the signal is flag=2. If no, flag #2. When the signal is different from threshold 2, the computer device may continue to detect whether the signal within the data block is the same as threshold 1 (which is a positive integer less than threshold 2). If the signal is the same as threshold 1, the encoding flag of the signal is flag=1. If no, flag #1. When the computer device determines that the signal is different from threshold 1, the computer device may continue to detect whether the signal within the data block is the same as threshold 0 (which is a positive integer less than threshold 2). If the signal is the same as threshold 0, the encoding flag of the signal is flag=0. If no, flag≠0. If determining that the signal is different from threshold 2, threshold 1, and threshold 0, the computer device may determine that the signal within the data block is greater than 2, may difference the signal within the data block according to the signal threshold to obtain a signal difference, and may code the signal difference. In this way, because less encoded data is obtained by encoding a smaller signal value, the data size of the encoded data can be reduced by encoding the signal difference corresponding to the signal, so as to improve the encoding and decoding efficiency.

After encoding the data block to obtain the encoded data of the data block, the computer device may associatively store the encoded data of the data block and the target encoded data of the data block, generate a bit stream of the point cloud data according to the encoded data corresponding to one or more data blocks respectively, and transmit the bit stream of the point cloud data to the decoding device, so that the decoding device reconstructs the point cloud data according to the bit stream of the point cloud data. Specifically, the computer device may store the encoding parameter corresponding to each data block in the point cloud data into one or more parameter sets, which include a corresponding relationship between data blocks in the point cloud data and corresponding encoding parameters. In this way, the computer device may transmit the one or more parameter sets and the bit stream of the point cloud data to the decoding device, and the decoding device may determine the encoding parameter of the corresponding data block from the parameter set as the decoding parameter. Or, the computer device may generate the bit stream of the point cloud data according to the target encoding parameter corresponding to the data block and the encoded data of the data block. Encoded data of one data block corresponds to one target encoding parameter.

In one embodiment of a possible implementation, the computer device may construct a geometric prediction tree of the point cloud data, obtain a geometric prediction residual of each node in the geometric prediction tree, and obtain geometric prediction tree residual information. When the computer device obtains the geometric prediction residual of each node in the geometric prediction tree, the geometric prediction residual of each node may be predicted with a signal value of a point previous thereto, or the geometric prediction residual of each node may be predicted with signal values of two points previous thereto, or the geometric prediction residual of each node may be predicted with signal values of al points previous thereto. Further, the computer device may take different exponential Golomb orders for initial residual information and other residual information in the geometric prediction tree based on the distribution of residual information in the geometric prediction tree, and denote the exponential Golomb orders as k1 and k2 respectively. The exponential Golomb of an adaptive order is configured for encoding the initial residual information and the other residual information to obtain the encoded data of the point cloud data. The initial order k1 is set as an order of the initial residual information based on the geometric information value range of the geometric prediction tree. The corresponding order is set as k2=k1+offset, where offset may be any integer. Or, the initial order is set as k2=k1.

k1 and k2 are adaptively adjusted, respectively, based on the residual information of preceding decoding points of the same type, where k1 is adaptively adjusted based on a mean of n1 pieces of preceding starting residual information, and k2 is adaptively adjusted based on a mean of n1 pieces of preceding other residual information. Or, k2 is adaptively adjusted by fixing the starting order k1.

In an implementation, the computer device may obtain an attribute prediction residual of a data point in the point cloud data, and determine an initial encoding parameter of the data point according to a signal feature of the attribute prediction residual of the data point. An upper limiting parameter and a lower limiting parameter are determined according to the initial encoding parameter. Further, the computer device may adjust the initial encoding parameter according to the signal feature of the attribute prediction residual of the data point, to obtain a target encoding parameter of the data point. Specifically, if the attribute prediction residual of the data point is less than the lower limiting parameter, the target encoding parameter of the data point is the initial encoding parameter plus one. If the attribute prediction residual of the data point is greater than the lower limiting parameter, the target encoding parameter of the data point is the initial encoding parameter minus one. Further, if the target encoding parameter is less than 0, it is determined that the target encoding parameter is equal to 0, or if the target encoding parameter is less than 0, it is determined that the target encoding parameter is equal to the initial encoding parameter.

In an implementation, the computer device may obtain an attribute transformation coefficient of a data point in the point cloud data, and determine an initial encoding parameter of the data point according to a signal feature of the attribute transformation coefficient of the data point. An upper limiting parameter and a lower limiting parameter are determined according to the initial encoding parameter. Further, the computer device may adjust the initial encoding parameter according to the signal feature of the attribute transformation coefficient of the data point, to obtain a target encoding parameter of the data point. Specifically, if the attribute transformation coefficient of the data point is less than the lower limiting parameter, the target encoding parameter of the data point is the initial encoding parameter plus one. If the attribute transformation coefficient of the data point is greater than the lower limiting parameter, the target encoding parameter of the data point is the initial encoding parameter minus one. Further, if the target encoding parameter is less than 0, it is determined that the target encoding parameter is equal to 0, or if the target encoding parameter is less than 0, it is determined that the target encoding parameter is equal to the initial encoding parameter.

In the embodiments of this disclosure, a signal within a data block in point cloud data and a signal feature of the signal are obtained, where an encoding mode of the point cloud data is an encoding mode of non-equal length encoding, and the signal is configured for reflecting a media attribute of the data block. It can be seen that by adopting the encoding mode of non-equal length encoding, a data size of encoded data of the data block can be reduced. A target encoding parameter of the data block under the encoding mode is determined according to the signal feature of the signal. The encoded data of the data block herein is bits for describing the encoded data of the data block. To be specific, the encoded data of the data block is a length of the encoded data of the data block. The signal within the data block is coded according to the target encoding parameter to obtain encoded data of the data block. It can be seen that by encoding the signal of the data block with an accurate target encoding parameter, the signal may be represented with less codes, so as to reduce the data size of the encoded data corresponding to the data block, reduce the pressure of network transmission, reduce the receiving pressure of a decoding device to receive the encoded data, and improve the decoding efficiency of the encoded data. In other words, it is adaptively determined how many codes are required to describe the encoded data of the data block based on the signal feature of the signal within the data block. To be specific, data blocks having different signal features have different codes. In this way, the redundancy of the encoded data of the data block can be effectively reduced, the length of the encoded data of the data block can be reduced, and the transmission efficiency of the encoded data of the data block can be improved.

Figure 5:
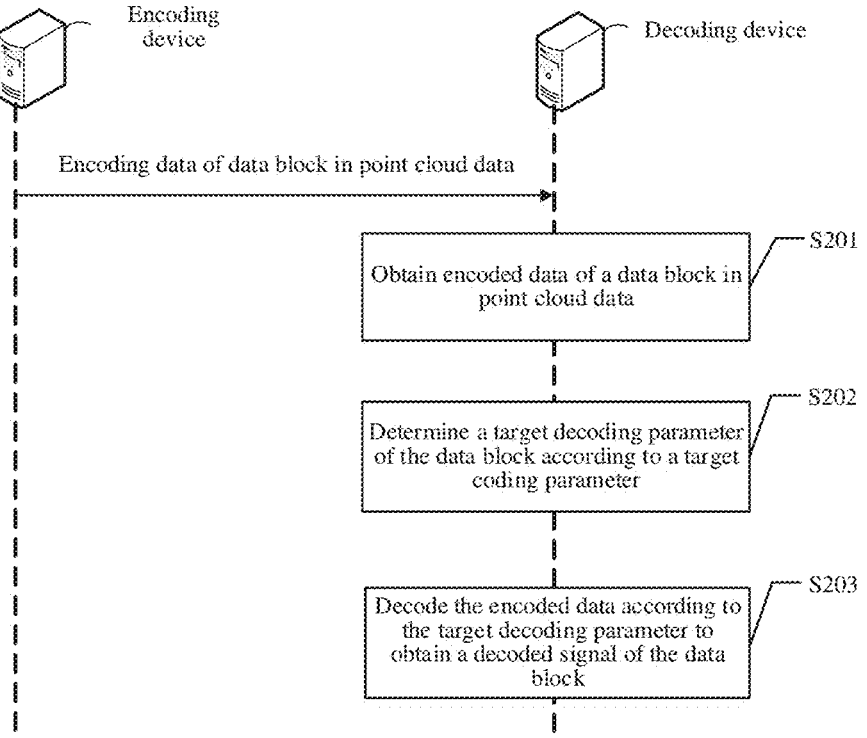
FIG. 5 is a schematic diagram of a method for decoding point cloud data according to embodiments of this disclosure.

As shown in FIG. 5, FIG. 5 is a schematic flowchart of a method for decoding point cloud data according to embodiments of this disclosure. The method for decoding point cloud data according to the embodiments of this disclosure will be described in detail below with reference to FIG. 5. The method may be performed by a computer device. The computer device may be a decoding device. As shown in FIG. 5, the method may specifically include but is not limited to the following operations:

S201: Obtain encoded data of a data block in point cloud data.

Specifically, the point cloud data is widely used in the construction of urban digital maps, and plays a technical supporting role in many popular researches such as smart cities, unmanned driving, and cultural relics protection. The computer device may acquire a surface of a target object through a 3D scanning device to obtain point cloud data. An encoding device may code the point cloud data to obtain encoded data corresponding to the point cloud data, and transmit the encoded data corresponding to the point cloud data to the decoding device. The decoding device decodes the encoded data of the point cloud data to obtain point cloud data and restores the point cloud data. The point cloud data includes one or more data blocks, and the data block is any of the one or more data blocks in the point cloud data. The data block may be any one data point in the point cloud data or a group of data points composed of at least two data points. For example, the data block may be the point cloud data, a macro block in the point cloud data, or a prediction tree (tree composed of a plurality of data points in the point cloud data) in the point cloud data. The encoded data of the data block is obtained by encoding a signal within the data block according to a target encoding parameter. The target encoding parameter is an encoding parameter of the data block under an encoding mode of non-equal length encoding, and the target encoding parameter is determined based on a signal feature of the signal. The encoding device may transmit the encoded data of the data block to the decoding device. After receiving the encoded data of the data block, the decoding device may determine a decoding mode for decoding the encoded data. The decoding mode may be a decoding mode corresponding to the encoding mode of non-equal length encoding.

The encoding mode of non-equal length encoding may be an unsigned exponential Golomb encoding mode, a signed exponential Golomb encoding mode, a truncated exponential Golomb encoding mode, and a mapping exponential Golomb encoding mode. A decoding mode of the data block is a decoding mode corresponding to the encoding mode of the data block. For example, when the encoding mode of the data block is an unsigned exponential Golomb encoding mode, the decoding mode of the data block is an unsigned exponential Golomb decoding mode.

S202: Determine a target decoding parameter of the data block according to the target encoding parameter.

The computer device may determine a target decoding parameter of the data block according to the target encoding parameter. The target decoding parameter may be the same as the target encoding parameter of the data block under the encoding mode. For example, when the target encoding parameter of the data block under the exponential Golomb encoding mode is "0 order", the target decoding parameter is "0 order". The target encoding parameter of the data block under the encoding mode may be determined based on a signal feature of the signal within the data block. The signal of the data block is configured for reflecting a media attribute of the data block. The media attribute may be an attribute such as geometric position information, color, reflectivity, classification value, intensity value, time, material characteristic, and texture information. There may be one or more signals within the data block. The signal may be obtained by the encoding device performing attribute prediction, attribute transformation, attribute prediction transformation, or attribute transformation prediction on the media attribute of the data block, such as geometric prediction residuals, attribute prediction residuals, or attribute transformation coefficients. The signal feature of the signal may be a signal threshold range of the signal, a distribution feature of the signal, a signal value magnitude of the signal, or a signal feature of an associated signal associated with the signal of the data block.

In an implementation, the signal threshold range of the signal may be determined based on a maximum signal and a minimum signal within the data block. Or, the signal range value is determined based on a sampling precision of the data block. The target encoding parameter corresponding to the data block may be queried from a second parameter table based on an index value. The second parameter table includes at least one index value and an encoding parameter associated with each index value in the at least one index value. The index value is obtained by quantizing and differencing the signal threshold range of the signal. In an implementation, the target encoding parameter may be determined according to encoded data of a coded data block having an adjacent relationship with the data block in the point cloud data. The process of determining the target encoding parameter corresponding to the data block may be referred to the above-mentioned process of determining the target encoding parameter corresponding to the data block by the encoding device in FIG. 2. Details are not described herein again in the embodiments of this disclosure.

In an implementation, the point cloud data includes at least two data groups. The data block falls within a first data group in the at least two data groups. Data blocks within the first data group correspond to the same encoding parameters. The coded data block falls within a second data group in the at least two data groups, which has an adjacent relationship with the first data group. The at least two data groups are grouped according to positions of data blocks in the point cloud data. Or, the at least two data groups are grouped according to Hilbert transformation codes corresponding to data blocks in the point cloud data. The corresponding Hilbert transformation codes of the data blocks in the point cloud data are obtained by performing Hilbert transformation on the position of each data block in the point cloud data. Or, the at least two data groups are obtained by dividing the point cloud data according to a division size. Or, the at least two data groups are obtained by dividing the point cloud data according to a specific limiting number and an encoding order of the data blocks. Different encoding parameters may be adopted among a plurality of signals with different attribute types within the data block. To be specific, one signal corresponds to one encoding parameter. Different sub-encoding signals within different signals may adopt the same encoding parameter or may adopt different encoding parameters, as described in FIG. 2. Details are not described herein again in the embodiments of this disclosure.

In an implementation, before determining a target decoding parameter, the computer device may obtain a parameter set corresponding to the point cloud data. The parameter set includes the encoding parameter corresponding to each data block in the point cloud data. The target encoding parameter corresponding to the data block is obtained from the parameter set corresponding to the point cloud data. In this way, the mode in which the computer device determines the target decoding parameter may be: determining the target encoding parameter corresponding to the data block as the target decoding parameter of the data block.

In an implementation, after encoding the data block to obtain the encoded data of the data block, the encoding device may associatively store the encoded data of the data block and the encoded data of the data block, and generate a bit stream of the point cloud data according to the encoded data corresponding to one or more data blocks respectively. Specifically, the encoding device may store the encoding parameter corresponding to each data block in the point cloud data into a parameter set, which includes a corresponding relationship between data blocks and encoding parameters, and transmit the parameter set to the decoding device. After obtaining the parameter set and the bit stream of the point cloud data, the decoding device may decode the encoded data corresponding to each data block in the point cloud data to obtain a decoded signal corresponding to each data block. The data block falls within the data blocks in the point cloud data. Specifically, the parameter set includes the encoding parameter corresponding to each data block in the point cloud data. The computer device may obtain a target encoding parameter corresponding to the data block from the parameter set corresponding to the point cloud data, and determine the target encoding parameter corresponding to the data block as the target decoding parameter of the data block.

The encoding device may alternatively associatively store the encoding parameter corresponding to each data block in the point cloud data into the bit stream of the point cloud data, and transmit the bit stream of the point cloud data to the decoding device. After receiving the bit stream of the point cloud data, the decoding device may obtain, from the bit stream of the point cloud data, the encoded data corresponding to each data block in the point cloud data and the encoding parameter corresponding to each data block. The computer device may obtain a target encoding parameter corresponding to the data block from the encoding parameter corresponding to each data block in the point cloud data, and determine the target encoding parameter corresponding to the data block as the target decoding parameter of the data block.

The computer device may determine, according to a parameter determining mode of the target encoding parameter, a target decoding parameter corresponding to the encoded data of the data block. The parameter determining mode may be a determining mode for encoding and decoding parameters defaulted by the encoding device and the decoding device for the point cloud data. The encoding device determines a target encoding parameter by using the parameter determining mode, and codes the point cloud data by using the target encoding parameter to obtain encoded data of the point cloud data. The decoding device may determine a target decoding parameter by using a mode which is the same as the parameter determining mode for the target encoding parameter, and decode the encoded data of the point cloud data by using the target decoding parameter to obtain the point cloud data. In other words, the mode in which the encoding device determines the target encoding parameter of the data block is the same as the mode in which the decoding device determines the target decoding parameter. The parameter determining mode for the target encoding parameter may be defaulted by the encoding device and the decoding device.

In an implementation, the parameter determining mode for the target encoding parameter includes a mode based on parameter table query. To be specific, the target encoding device determines the index value based on the signal feature of the signal within the data block, and queries the target encoding parameter corresponding to the data block from the second parameter table. The specific content may be referred to the content described in FIG. 2. Details are not described herein again in the embodiments of this disclosure. The specific mode in which the computer device determines the target decoding parameter may include: obtaining a signal range value of the signal within the data block; quantizing the signal range value to obtain a quantized signal range value; obtaining a logarithmic value of the quantized signal range value, and differencing the logarithmic value to obtain an index value corresponding to the data block; querying, from a first parameter table, a decoding parameter associated with the index value, where the first parameter table includes at least one index value and a decoding parameter associated with each index value in the at least one index value; and determining the queried decoding parameter as the target decoding parameter of the data block.

Specifically, the computer device may obtain a signal range value corresponding to the signal within the data block. The signal range value may be transmitted from the encoding device to the decoding device. The computer device may generate, according to the signal range value corresponding to the signal within the data block, an index value corresponding to the data block. Specifically, the computer device may obtain a quantization step (which may be obtained from a quantization parameter). The quantization step may be preset by a manager or may be determined according to a signal range of the signal. Further, the computer device may quantize, based on the quantization step, the signal range value of the signal to obtain a quantized signal range value. By quantizing the signal range value, the signal range value falling within a range may be replaced with a signal range value to compress data, so as to be convenient to quickly query the index value. Further, the computer device may obtain a logarithmic value of the quantized signal range value, and difference the logarithmic value to obtain an index value corresponding to the data block.

An encoding parameter associated with the index value is queried from the first parameter table, where the first parameter table includes at least one index value and a decoding parameter associated with each index value in the at least one index value, and one index value corresponds to one decoding parameter. The computer device may determine the queried decoding parameter as the target decoding parameter of the data block. The first parameter table is the same as the first parameter table in the encoding device, and may be transmitted from the encoding device to the decoding device. The first parameter table may be generated by the decoding device according to the mode in which the encoding device generates the second parameter table.

In an implementation, the parameter determining mode for the target encoding parameter includes a mode based on data blocks having an adjacent relationship. To be specific, the encoding device adjusts the initial order based on the encoded data of the coded data block having an adjacent relationship with the data block in the point cloud data to obtain the target encoding parameter. The specific content may be referred to the content described in FIG. 2. Details are not described herein again in the embodiments of this disclosure. The specific mode in which the computer device determines the target decoding parameter may include: obtaining a signal range value corresponding to the signal within the data block; determining an initial decoding parameter of a target data block according to the signal range value corresponding to the data block; obtaining a decoded signal of a decoded data block having an adjacent relationship with the data block in the point cloud data; and adjusting, according to the decoded signal of the decoded data, the initial decoding parameter to obtain the target decoding parameter corresponding to the encoded data of the data block.

Specifically, the computer device obtains a signal range value corresponding to the signal within the data block, and determines an initial decoding parameter of a target data block according to the signal range value corresponding to the data block. The specific determining process may be referred to the process of determining an index value according to the signal range value corresponding to the data block and determining the target decoding parameter from the first parameter table according to the index value. Further, the computer device may obtain a decoded data block having an adjacent relationship with the data block in the point cloud data, and adjust the initial decoding parameter according to a decoded signal of the decoded data to obtain the target decoding parameter. The specific content may be referred to the process of determining the target encoding parameter according to the encoded data of the coded data block by the encoding device in FIG. 2. To be specific, the mode in which the decoding device determines the target decoding parameter is the same as the mode in which the encoding device determines a target encoding mode. Details are not described herein again in the embodiments of this disclosure.

In an implementation, the signal range value of the signal within the data block may be determined based on a maximum signal and a minimum signal within the data block. Or, the signal range value is determined based on a sampling precision of the signal within the data block.

Specifically, the signal feature may be the signal range value of the signal within the data block. The signal range value is determined based on the maximum signal and the minimum signal within the data block. The maximum signal and the minimum signal within the data block may be transmitted by the encoding device. Specifically, the signal range value may be a difference between a signal value of the maximum signal and a signal value of the minimum signal within the data block. For example, when the signal of the data block is a geometric prediction residual, the signal range value may be a difference between a maximum geometric prediction residual and a minimum geometric prediction residual. For example, if the signal value of the maximum signal within the data block is 6 and the signal value of the minimum signal is 0, the signal range value of the signal within the data block is 6. Or, the signal range value of the signal may be determined based on a sampling precision of the signal within the data block. The sampling precision of the signal within the data block is transmitted from the encoding device to the decoding device. For example, if a geometric precision of the point cloud data is 10 bits, a sampling precision of the signal within the data block in the point cloud data may be 10 bits, and the signal range value of the signal of the data block may be 210.

In an implementation, if the encoding mode of the encoding device may be an exponential Golomb encoding mode, the decoding mode of the decoding device may be the exponential Golomb encoding mode. The initial decoding parameter of the data block is an initial order (the same as the initial encoding parameter of the data block in the encoding device). The specific mode in which the computer device adjusts the initial decoding parameter may include: determining a final signal value of the decoded signal of the decoded data block; determining a first limiting order and a second limiting order according to the initial order, where the first limiting order is less than the second limiting order; obtaining a magnitude relationship between the final signal value and the first and second limiting orders; and adjusting the initial order according to the magnitude relationship to obtain a target order associated with the data block, and determining the target order as the target decoding parameter.

Specifically, there may be one or n1 decoded data blocks. If the encoding device adjusts the initial order with one coded data block, there is one decoded data block. If the encoding device adjusts the initial order with n1 coded data blocks, there are n1 decoded data blocks. When there is one decoded data block and there is one decoded signal within the coded data block, a final signal value of the decoded signal of the decoded data block may be a signal value corresponding to the decoded signal within the decoded data block. When there is one decoded data block and there are n1 decoded signals within the decoded data block, the final signal value of the decoded signal of the decoded data block may be a mean of signal values corresponding to the n1 decoded signals. When there are n1 decoded data blocks, the final signal value may be a mean of the decoded signals of the n1 decoded data blocks. The computer device may determine a first limiting order and a second limiting order according to the initial order, where the first limiting order is less than the second limiting order. The computer device may be provided with a buffer for storing the decoded data block. The buffer size is n1, and the final signal value of the decoded data block is counted every n2 points. The decoded data block may be a data point in the point cloud data, and the initial order may be adjusted every n1 data points.

Specifically, the first limiting order is a lower limiting order, and the second limiting order may be an upper limiting order. The initial order is represented by golombNum, the first limiting order is represented by golombNumLow, and the second limiting order is represented by golombNumUP. In an implementation, the mode in which the computer device determines a first limiting order and a second limiting order according to the initial order may include, but is not limited to, the following modes: Mode 1: $golombNumLow=2\hat{}golombNum$, $golombNumUp=2\hat{}(golombNum+1)$. Mode 2: $golombNumLow=2\hat{}(golombNum-1)$, $golombNumUp=2\hat{}golombNum$. Mode 3: $golombNumUp=2\hat{}((golombNum-1))+2\hat{}((golombNum-2))$; $golombNumLow=2\hat{}((golombNum-1))-2\hat{}((golombNum-2))$. In addition to the above-mentioned modes, the first limiting order and the second limiting order may be determined in other modes according to specific situations. Details are not described herein again in the embodiments of this disclosure.

The computer device may obtain a magnitude relationship between the final signal value of the decoded signal of the decoded data block and the first and second limiting orders. The magnitude relationship may include that the final signal value is less than the first limiting order, or that the final signal value is greater than the second limiting order, or that the final signal value is greater than or equal to the first limiting order and less than or equal to the second limiting order. The computer device may adjust the initial order according to the magnitude relationship to obtain a target order associated with the data block. The computer device may determine the target order as the target decoding parameter.

In an implementation, the specific mode in which the computer device adjusts the initial order may include, but is not limited to, the following modes: determining, if the magnitude relationship indicates that the final signal value is less than the first limiting order, a sum of the initial order and a first adjustment step as the target order; determining, if the magnitude relationship indicates that the final signal value is greater than the second limiting order, a difference between the initial order and the first adjustment step as the target order; and determining, if the magnitude relationship indicates that the final signal value is greater than or equal to the first limiting order and is less than or equal to the second limiting order, the initial order as the target order.

If the computer device determines that the magnitude relationship indicates that a target signal value is less than the first limiting order, the computer device may determine a sum of the initial order and a first adjustment step as a target order associated with a target data block. The first adjustment step may be determined by historical encoding record information, or the first adjustment step may be determined by a manager. The first adjustment step may be a value of 1, 2, 3, or the like. If the magnitude relationship indicates that the final signal value is greater than the second limiting order, the computer device may determine a difference between the initial order and the first adjustment step as the target order. If the magnitude relationship indicates that the final signal value is greater than or equal to the first limiting order and is less than or equal to the second limiting order, the initial order is not adjusted, and the initial order is determined as the target order.

In an implementation, a decoding parameter corresponding to the decoded data block is obtained, where the decoding parameter of the decoded data block includes a historical order of the decoded data block. If the magnitude relationship indicates that the final signal value is less than the first limiting order, a sum of the historical order and a second adjustment step is determined as the target order. If the magnitude relationship indicates that the final signal value is greater than the second limiting order, a difference between the historical order and the second adjustment step is determined as the target order. If the magnitude relationship indicates that the final signal value is greater than or equal to the first limiting order and is less than or equal to the second limiting order, the initial order is determined as the target order.

The computer device may obtain the historical order corresponding to the decoded data block. If the magnitude relationship indicates that the final signal value is less than the first limiting order, a sum of the historical order and a second adjustment step is determined as the target order. The second adjustment step may be the same as the first adjustment step or may be different from the first adjustment step. Similarly, the second adjustment step may alternatively be determined by historical encoding record information, or the second adjustment step may be determined by a manager. The second adjustment step may be a value of 1, 2, 3, or the like. If the magnitude relationship indicates that the final signal value is greater than the second limiting order, a difference between the historical order and the second adjustment step is determined as the target order. If the magnitude relationship indicates that the final signal value is greater than or equal to the first limiting order and is less than or equal to the second limiting order, the initial order is determined as the target order. The specific content may be referred to the adjusted content of the initial order in FIG. 2. Details are not described herein again in the embodiments of this disclosure.

In an implementation, the specific mode in which the computer device adjusts the initial order may include, but is not limited to, the following modes: adjusting the initial order according to the magnitude relationship to obtain a candidate order associated with the data block; determining, if the candidate order is less than or equal to a third limiting order, a sum of the candidate order and a third adjustment step as the target order; determining, if the candidate order is greater than or equal to a fourth limiting order, a difference between the candidate order and the third adjustment step as the target order, where the third limiting order is less than the fourth limiting order; and determine, if the candidate order is greater than the third limiting order and less than the fourth limiting order, the candidate order as the target order.

The computer device may adjust the initial order according to the magnitude relationship to obtain a candidate order associated with the data block. The specific process of adjusting the initial order may be referred to the above-mentioned process of adjusting the initial order. The computer device may detect a relationship between the candidate order associated with the data block and the third and fourth limiting orders, and adjust the candidate order according to the relationship to obtain the target order associated with the data block. The third limiting order and the fourth limiting order are configured for limiting the target order within a reasonable order range. The third limiting order is less than the fourth limiting order. If the candidate order is less than or equal to the third limiting order, a magnitude of the candidate order may be determined, and a sum of the candidate order and the third adjustment step may be determined as the target order. Or, if the candidate order is less than or equal to the third limiting order, a first preset order may be used as the target order. The first preset order is greater than the third limiting order and less than the fourth limiting order. To be specific, the first preset order is within a reasonable order range. If the candidate order is greater than or equal to the fourth limiting order, a difference between the candidate order and the third adjustment step may be determined as the target order. Or, if the candidate order is greater than the fourth limiting order, a second preset order may be determined as the target order. The second preset order is greater than the third limiting order and less than the fourth limiting order. To be specific, the second preset order is within a reasonable order range. If the candidate order is greater than the third limiting order and less than the fourth limiting order, it is indicated that the candidate order is within a reasonable order range, the candidate order is not adjusted, and the candidate order is determined as the target order.

The specific content may be referred to the process of determining the target encoding parameter based on coded data blocks having an adjacent relationship in FIG. 2. To be specific, the process of determining, by the decoding device, the target decoding parameter based on the coded data blocks is the same as the process of determining, by the encoding device, the target encoding parameter according to the coded data blocks.

In an implementation, the encoded data of the data block includes first encoded data and second encoded data. The first encoded data has a different attribute type from the second encoded data. The target decoding parameter of the data block includes a first decoding parameter and a second decoding parameter. The first decoding parameter is configured for decoding the first encoded data, and the second decoding parameter is configured for decoding the second encoded data. The first decoding parameter is different from the second decoding parameter.

In an implementation, the first encoded data includes first sub-encoded data, second sub-encoded data, and third sub-encoded data. The first decoding parameter is determined based on sub-signal features corresponding to the first sub-encoded data, the second sub-encoded data, and the third sub-encoded data, respectively. Or, decoding parameters corresponding to the first sub-encoded data, the second sub-encoded data, and the third sub-encoded data, respectively, are determined as the first decoding parameter. Or, a decoding parameter corresponding to associated information associated with the first encoded data is determined as the first decoding parameter.

In an implementation, the first encoded data includes first sub-encoded data, second sub-encoded data, and third sub-encoded data. The first decoding parameter includes a first sub-decoding parameter corresponding to the first sub-encoded data, a second sub-decoding parameter corresponding to the second sub-encoded data, and a third sub-decoding parameter corresponding to the third sub-encoded data. The first sub-decoding parameter is determined based on a sub-signal feature corresponding to the first sub-encoded data. The second sub-decoding parameter is determined based on the first sub-decoding parameter and a parameter offset. The third sub-decoding parameter is determined based on the second sub-decoding parameter and the parameter offset.

The above-mentioned content may be described with reference to FIG. 2. The mode in which the encoding device determines the target encoding parameter of the data block is the same as the mode in which the decoding device determines the target decoding parameter of the encoded data of the data block. Details are not described herein again in the embodiments of this disclosure.

S203: Decode the encoded data according to the target decoding parameter to obtain a decoded signal of the data block.

The computer device may decode the encoded data according to the target decoding parameter to obtain a decoded signal of the data block. The decoded signal is configured for reflecting a media attribute of the data block. The media attribute of the data block may include an attribute such as geometric position information, color, reflectivity, classification value, intensity value, time, material characteristic, and texture information. The decoded signal may be obtained by performing attribute prediction, attribute transformation, attribute prediction transformation, or attribute transformation prediction on the media attribute of the data block, such as geometric prediction residuals, attribute prediction residuals, or attribute transformation coefficients.

In an implementation, the encoded data of the data block includes an encoding flag and a signal threshold. The specific mode in which the computer device decodes the encoded data may include: decoding, if the encoding flag in the encoded data of the data block is a first encoding flag, the encoded data according to the target decoding parameter to obtain an initial decoded signal, and sum the initial decoded signal according to the signal threshold to obtain a decoded signal of the data block, where the first encoding flag is configured for indicating that the decoded signal of the data block is different from the signal threshold; and determining, if the encoding flag in the encoded data of the data block is a second encoding flag, the signal threshold as the decoded signal of the data block, where the second encoding flag is configured for indicating that the decoded signal of the data block is the same as the signal threshold.

Specifically, if the computer device detects that the encoded data of the data block includes an encoding flag and a signal threshold, the computer device may detect whether the encoding flag in the encoded data of the data block is a first encoding flag. If the encoding flag in the encoded data is a first encoding flag, the first encoding flag is configured for indicating that the decoded signal of the data block is different from the signal threshold, and the computer device may decode the encoded data corresponding to the data block according to the target decoding parameter to obtain an initial decoded signal. Further, the computer device may sum the initial decoded signal according to the signal threshold to obtain the decoded signal of the data block. For example, when the encoding device codes the signal of the data block based on that a signal difference is equal to a difference between the signal value of the signal and (m+1), the decoding device may use the sum of the initial decoded signal and m+1 as the decoded signal of the data block, where m is the signal threshold. If the encoding flag in the encoded data of the data block is a second encoding flag, the second encoding flag is configured for indicating that the decoded signal of the data block is the same as the signal threshold, and the computer device may determine the signal threshold as the decoded signal of the data block.

In the embodiments of this disclosure, a data block in point cloud data may be used as a data block. Encoded data of the data block is obtained by encoding a signal in the data block according to a target encoding parameter. The target encoding parameter is an encoding parameter of the data block under an encoding mode of non-equal length encoding. The target encoding parameter is determined based on a signal feature of the signal. The encoded data of the data block herein is bits for describing the encoded data of the data block. To be specific, the encoded data of the data block is a length of the encoded data of the data block. In other words, it is adaptively determined how many codes (namely, bits) are required to describe the encoded data of the data block based on the signal feature of the signal within the data block. To be specific, data blocks having different signal features have different codes (namely, different bits). In this way, the redundancy of the encoded data of the data block can be effectively reduced, the length of the encoded data of the data block can be reduced, and the transmission efficiency of the encoded data of the data block can be improved. Further, after receiving the encoded data of the data block, a decoding device may decode the encoded data of the data block according to a target decoding parameter to obtain a decoded signal of the data block. The target decoding parameter is determined by the target encoding parameter. Because the redundancy of the encoded data of the data block is relatively low, the decoded signal of the data block can be quickly decoded, thereby improving the decoding efficiency.

Figure 6:
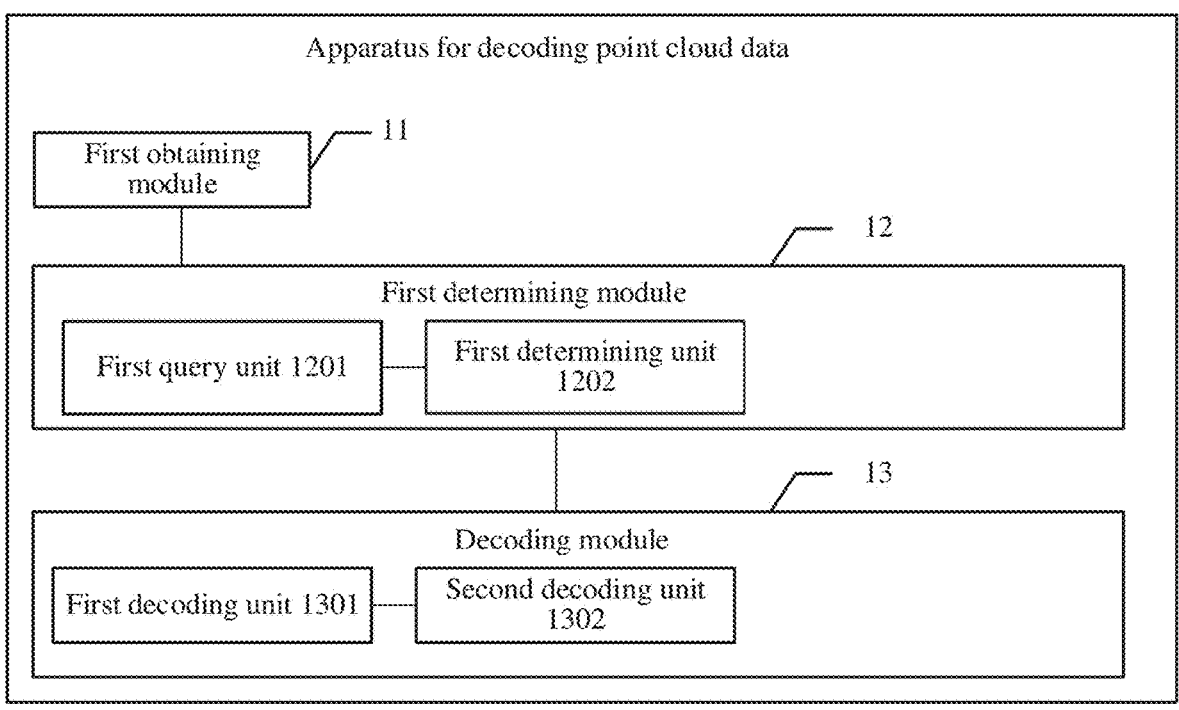
FIG. 6 is a schematic structural diagram of an apparatus for decoding point cloud data according to embodiments of this disclosure.

Reference is made to FIG. 6. FIG. 6 is a schematic structural diagram of an apparatus for decoding point cloud data according to embodiments of this disclosure. The apparatus for decoding point cloud data may be a computer program (including program codes) running in a computer device. For example, the apparatus for decoding point cloud data is application software. The apparatus for decoding point cloud data may be configured to perform corresponding operations in the method for decoding point cloud data according to embodiments of this disclosure. As shown in FIG. 6, the apparatus for decoding point cloud data may include: a first obtaining module 11, a first determining module 12, and a decoding module 13.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The first obtaining module 11 is configured to obtain encoded data of a data block in point cloud data. The encoded data of the data block is obtained by encoding a signal in the data block according to a target encoding parameter. The target encoding parameter is an encoding parameter of the data block under an encoding mode of non-equal length encoding. The target encoding parameter is determined based on a signal feature of the signal.

The first determining module 12 is configured to determine a target decoding parameter of the data block according to the target encoding parameter.

The decoding module 13 is configured to decode the encoded data of the data block according to the target decoding parameter to obtain a decoded signal of the data block. The decoded signal is configured for reflecting a media attribute of the data block.

The first determining module 12 includes:

a first query unit 1201, configured to obtain the target encoding parameter corresponding to the data block from a parameter set corresponding to the point cloud data; and a first determining unit 1202, configured to determine the target encoding parameter as the target decoding parameter.

The operation that the first determining module 12 determines a target decoding parameter of the data block according to the target encoding parameter includes:

obtaining, if the target encoding parameter is determined based on parameter table query, a signal range value of the signal;

determining, according to the signal range value of the signal, an index value corresponding to the data block;

querying, from a first parameter table, a decoding parameter associated with the index value, where the first parameter table includes at least one index value and a decoding parameter associated with each index value in the at least one index value; and determining the queried decoding parameter as the target decoding parameter.

The operation that the first determining module 12 determines a target decoding parameter of the data block according to the target encoding parameter includes:

obtaining, if the target encoding parameter is determined based on data blocks having an adjacent relationship, a signal range value of the signal;

determining, according to the signal range value of the signal, an initial decoding parameter of the data block;

obtaining a decoded data block having an adjacent relationship with the data block in the point cloud data; and adjusting, according to a decoded signal of the decoded data, the initial decoding parameter to obtain the target decoding parameter.

The initial decoding parameter is an initial order. The operation that the first determining module 12 adjusts, according to a decoded signal of the decoded data, the initial decoding parameter to obtain the target decoding parameter includes:

determining a final signal value of the decoded signal of the decoded data block;

determining a first limiting order and a second limiting order according to the initial order, where the first limiting order is less than the second limiting order;

obtaining a magnitude relationship between the final signal value and the first and second limiting orders;

adjusting the initial order according to the magnitude relationship to obtain a target order associated with the data block; and determining the target order as the target decoding parameter.

The operation that the first determining module 12 adjusts the initial order according to the magnitude relationship to obtain a target order associated with the data block includes:

determining, if the magnitude relationship indicates that the final signal value is less than the first limiting order, a sum of the initial order and a first adjustment step as the target order;

determining, if the magnitude relationship indicates that the final signal value is greater than the second limiting order, a difference between the initial order and the first adjustment step as the target order; and determining, if the magnitude relationship indicates that the final signal value is greater than or equal to the first limiting order and is less than or equal to the second limiting order, the initial order as the target order.

The operation that the first determining module 12 adjusts the initial order according to the magnitude relationship to obtain a target order associated with the data block includes:

obtaining a decoding parameter corresponding to the decoded data block, where the decoding parameter of the decoded data block includes a historical order of the decoded data block;

determining, if the magnitude relationship indicates that the final signal value is less than the first limiting order, a sum of the historical order and a second adjustment step as the target order;

determining, if the magnitude relationship indicates that the final signal value is greater than the second limiting order, a difference between the historical order and the second adjustment step as the target order; and determining, if the magnitude relationship indicates that the final signal value is greater than or equal to the first limiting order and is less than or equal to the second limiting order, the initial order as the target order.

The operation that the first determining module 12 adjusts the initial order according to the magnitude relationship to obtain a target order associated with the data block includes:

adjusting the initial order according to the magnitude relationship to obtain a candidate order associated with the data block;

determining, if the candidate order is less than or equal to a third limiting order, a sum of the candidate order and a third adjustment step as the target order;

determining, if the candidate order is greater than or equal to a fourth limiting order, a difference between the candidate order and the third adjustment step as the target order, where the third limiting order is less than the fourth limiting order; and determining, if the candidate order is greater than the third limiting order and less than the fourth limiting order, the candidate order as the target order.

The signal range value of the signal is determined based on a maximum signal and a minimum signal within the data block. Or, the signal range value of the signal is determined based on a sampling precision of the signal within the data block.

The encoded data of the data block includes first encoded data and second encoded data. The first encoded data has a different attribute type from the second encoded data.

The target decoding parameter includes a first decoding parameter and a second decoding parameter. The first decoding parameter is configured for decoding the first encoded data, and the second decoding parameter is configured for decoding the second encoded data. The first decoding parameter is different from the second decoding parameter.

The first encoded data includes first sub-encoded data, second sub-encoded data, and third sub-encoded data.

The first decoding parameter is determined based on sub-signal features corresponding to the first sub-encoded data, the second sub-encoded data, and the third sub-encoded data, respectively.

Or, decoding parameters corresponding to the first sub-encoded data, the second sub-encoded data, and the third sub-encoded data, respectively, are determined as the first decoding parameter.

Or, a decoding parameter corresponding to associated information associated with the first encoded data is determined as the first decoding parameter.

The first encoded data includes first sub-encoded data, second sub-encoded data, and third sub-encoded data. The first decoding parameter includes a first sub-decoding parameter corresponding to the first sub-encoded data, a second sub-decoding parameter corresponding to the second sub-encoded data, and a third sub-decoding parameter corresponding to the third sub-encoded data.

The first sub-decoding parameter is determined based on a sub-signal feature corresponding to the first sub-encoded data.

The second sub-decoding parameter is determined based on the first sub-decoding parameter and a parameter offset.

The third sub-decoding parameter is determined based on the second sub-decoding parameter and the parameter offset.

The encoded data of the data block includes an encoding flag and a signal threshold. The decoding module 13 includes:

a first decoding unit 1301, configured to: decode, if the encoding flag in the encoded data of the data block is a first encoding flag, the encoded data according to the target decoding parameter to obtain an initial decoded signal; sum the initial decoded signal according to the signal threshold to obtain the decoded signal of the data block, where the first encoding flag is configured for indicating that the decoded signal of the data block is different from the signal threshold; and a second decoding unit 1302, configured to determine, if the encoding flag in the encoded data of the data block is a second encoding flag, the signal threshold as the decoded signal of the data block, where the second encoding flag is configured for indicating that the decoded signal of the data block is the same as the signal threshold.

According to one embodiment of this disclosure, various modules in the apparatus for decoding point cloud data shown in FIG. 6 may be respectively or completely combined into one or more units to constitute the apparatus, or some unit(s) therein may be further divided into a plurality of functionally smaller subunits, and the same operation may be realized without affecting the achievement of the technical effects of embodiments of this disclosure. The modules are divided based on logical functions. In practice, the functions of one module may alternatively be realized by a plurality of units, or the functions of a plurality of modules may be realized by one unit. In other embodiments of this disclosure, the apparatus for decoding point cloud data may further include other units. In practice, the functions may alternatively be realized with the aid of other units, and may be realized in cooperation by a plurality of units.

In this disclosure, encoded data of a data block in point cloud data is obtained by encoding a signal within the data block according to a target encoding parameter of the data block under an encoding mode of non-equal length encoding. The target encoding parameter is determined based on a signal feature of the signal within the data block. The encoded data of the data block herein is bits for describing the encoded data of the data block. To be specific, the encoded data of the data block is a length of the encoded data of the data block. In other words, it is adaptively determined how many codes are required to describe the encoded data of the data block based on the signal feature of the signal within the data block. To be specific, data blocks having different signal features have different codes. In this way, the redundancy of the encoded data of the data block can be effectively reduced, the length of the encoded data of the data block can be reduced, and the transmission efficiency of the encoded data of the data block can be improved. Further, after receiving the encoded data of the data block, a decoding device may decode the encoded data of the data block according to a target decoding parameter to obtain a decoded signal of the data block. The target decoding parameter is determined by the target encoding parameter. Because the redundancy of the encoded data of the data block is relatively low, the decoded signal of the data block can be quickly decoded, thereby improving the decoding efficiency.

Figure 7:
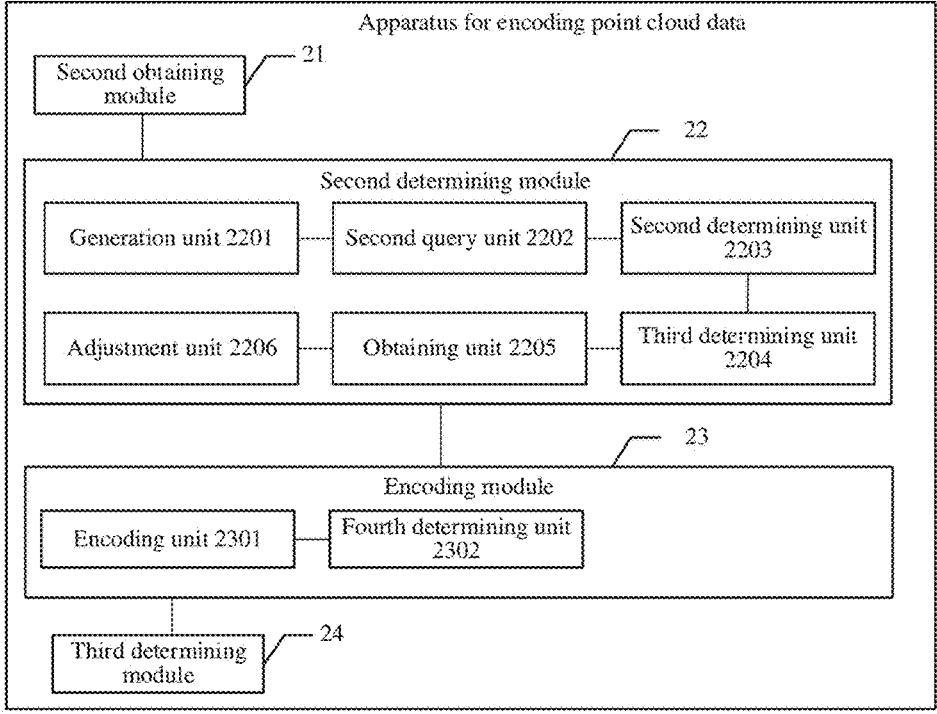
FIG. 7 is a schematic structural diagram of an apparatus for encoding point cloud data according to embodiments of this disclosure.

Reference is made to FIG. 7. FIG. 7 is a schematic structural diagram of an apparatus for encoding point cloud data according to embodiments of this disclosure. The apparatus for encoding point cloud data may be a computer program (including program codes) running in a computer device. For example, the apparatus for encoding point cloud data is application software. The apparatus for encoding point cloud data may be configured to perform corresponding operations in the method for encoding point cloud data according to embodiments of this disclosure. As shown in FIG. 7, the apparatus for encoding point cloud data may include: a second obtaining module 21, a second determining module 22, an encoding module 23, and a third determining module 24.

The second obtaining module 21 is configured to obtain a signal within a data block in point cloud data, and a signal feature of the signal. An encoding mode of the point cloud data is an encoding mode of non-equal length encoding, and the signal is configured for reflecting a media attribute of the data block.

The second determining module 22 is configured to determine, according to the signal feature of the signal, a target encoding parameter of the data block under the encoding mode.

The encoding module 23 is configured to code the signal according to the target encoding parameter to obtain encoded data of the data block.

The signal feature of the signal includes a signal range value of the signal. The signal range value is determined based on a maximum signal and a minimum signal within the data block. Or, The signal range value is determined based on a sampling precision of the signal.

The second determining module 22 includes:

a generation unit 2201, configured to: quantize the signal range value in the signal feature to obtain a quantized signal range value; and obtain a logarithmic value of the quantized signal range value, and difference the logarithmic value to obtain an index value corresponding to the data block;

a second query unit 2202, configured to query, from a second parameter table, an encoding parameter associated with the index value, where the second parameter table includes at least one index value and an encoding parameter associated with each index value in the at least one index value, the number of index values in the second parameter table is the same as the number of data blocks in a first data group, the first data group is a data group including the data block in at least two data groups, the at least two data groups are data groups in the point cloud data, the index value falls within an index value range, and the index value range is determined according to the at least one index value in the second parameter table; and a second determining unit 2203, configured to determine the queried encoding parameter as the target encoding parameter.

The second determining module 22 includes:

a third determining unit 2204, configured to determine, according to the signal feature of the signal, an initial encoding parameter of the data block under the encoding mode;

an obtaining unit 2205, configured to obtain a coded data block having an adjacent relationship with the data block in the point cloud data; and an adjustment unit 2206, configured to adjust, according to encoded data of the coded data block, the initial encoding parameter to obtain the target encoding parameter.

The initial encoding parameter is an initial order.

The adjustment unit 2206 is specifically configured to:

determine a final encoding value of the encoded data of the coded data block;

determine a first limiting order and a second limiting order according to the initial order, where the first limiting order is less than the second limiting order;

obtain a magnitude relationship between the final encoding value and the first and second limiting orders;

adjust the initial order according to the magnitude relationship to obtain a target order associated with the data block; and determine the target order as the target encoding parameter.

The adjustment unit 2206 is specifically configured to:

determine, if the magnitude relationship indicates that the final encoding value is less than the first limiting order, a sum of the initial order and a first adjustment step as the target order;

determine, if the magnitude relationship indicates that the final encoding value is greater than the second limiting order, a difference between the initial order and the first adjustment step as the target order; and determine, if the magnitude relationship indicates that the final encoding value is greater than or equal to the first limiting order and is less than or equal to the second limiting order, the initial order as the target order.

The adjustment unit 2206 is specifically configured to:

obtain an encoding parameter corresponding to the coded data block, where the encoding parameter of the coded data block includes a historical order of the coded data block;

determine, if the magnitude relationship indicates that the final encoding value is less than the first limiting order, a sum of the historical order and a second adjustment step as the target order;

determine, if the magnitude relationship indicates that the final encoding value is greater than the second limiting order, a difference between the historical order and the second adjustment step as the target order; and determine, if the magnitude relationship indicates that the final encoding value is greater than or equal to the first limiting order and is less than or equal to the second limiting order, the initial order as the target order.

The adjustment unit 2206 is specifically configured to:

adjust the initial order according to the magnitude relationship to obtain a candidate order associated with the data block;

determine, if the candidate order is less than or equal to a third limiting order, a sum of the candidate order and a third adjustment step as the target order;

determine, if the candidate order is greater than or equal to a fourth limiting order, a difference between the candidate order and the third adjustment step as the target order, where the third limiting order is less than the fourth limiting order; and determine, if the candidate order is greater than the third limiting order and less than the fourth limiting order, the candidate order as the target order.

The final encoding value is a mean of all encoding values in the encoded data of the coded data block. Or, the final encoding value is a mean of non-zero encoding values in the encoded data of the coded data block.

The point cloud data includes at least two data groups. The data block falls within a first data group in the at least two data groups. Encoding parameters corresponding to data blocks within the first data group are the target encoding parameter.

The coded data block falls within a second data group in the at least two data groups. The second data group has an adjacent relationship with the first data group.

The at least two data groups are grouped according to positions of data blocks in the point cloud data. Or, The at least two data groups are grouped according to Hilbert transformation codes corresponding to data blocks in the point cloud data. The corresponding Hilbert transformation codes of the data blocks in the point cloud data are obtained by performing Hilbert transformation on the position of each data block in the point cloud data. Or, The at least two data groups are obtained by dividing the point cloud data according to a division size. Or, The at least two data groups are obtained by dividing the point cloud data according to a target limiting number and an encoding order of the data blocks.

The signal within the data block includes one or more of a geometric prediction residual, an attribute prediction residual, and an attribute transformation coefficient.

The signal includes a first signal and a second signal. The first signal has a different attribute type from the second signal.

The target encoding parameter includes a first encoding parameter and a second encoding parameter. The first encoding parameter is configured for encoding the first signal, and the second encoding parameter is configured for encoding the second signal. The first encoding parameter is different from the second encoding parameter.

The first signal includes a first sub-encoding signal, a second sub-encoding signal, and a third sub-encoding signal.

The first encoding parameter is determined based on sub-signal features corresponding to the first sub-encoding signal, the second sub-encoding signal, and the third sub-encoding signal, respectively.

Or, encoding parameters corresponding to the first sub-encoding signal, the second sub-encoding signal, and the third sub-encoding signal, respectively, are determined as the first encoding parameter.

Or, an encoding parameter corresponding to associated information associated with the first signal is determined as the first encoding parameter.

The first signal includes a first sub-encoding signal, a second sub-encoding signal, and a third sub-encoding signal. The first encoding parameter includes a first sub-encoding parameter corresponding to the first sub-encoding signal, a second sub-encoding parameter corresponding to the second sub-encoding signal, and a third sub-encoding parameter corresponding to the third sub-encoding signal.

The first sub-encoding parameter is determined based on a sub-signal feature corresponding to the first sub-encoding signal.

The second sub-encoding parameter is determined based on the first sub-encoding parameter and a parameter offset.

The third sub-encoding parameter is determined based on the second sub-encoding parameter and the parameter offset.

The number of signals within the data block is M, where M is a positive integer.

The encoding module 23 includes:

an encoding unit 2301, configured to code, if the signal is different from a signal threshold, the signal according to a first encoding flag and the target encoding parameter to obtain encoded data of the signal, where the signal falls within M the signals, the signal threshold is a signal which appears most frequently among the M signals, the first encoding flag is configured for indicating that the signal is different from the signal threshold, and i is a positive integer less than or equal to M; and a fourth determining unit 2302, configured to determine, if encoded data corresponding to the M signals respectively is obtained, the encoded data corresponding to the M signals respectively as the encoded data of the data block.

The apparatus for encoding point cloud data further includes:

a third determining module 24, configured to determine, if the signal is the same as the signal threshold, a second encoding flag as encoded data of the signal, where the second encoding flag is configured for indicating that the signal is the same as the signal threshold.

The encoding unit 2301 is specifically configured to:

generate, if the signal is different from a signal threshold, a first encoding flag, where the first encoding flag is configured for indicating that the signal is different from the signal threshold;

difference the signal according to the signal threshold to obtain a signal difference; and code the signal difference according to the target encoding parameter to obtain a signal encoding value of the signal, and determine the signal encoding value and the first encoding flag as the encoded data of the data block.

According to one embodiment of this disclosure, various modules in the apparatus for encoding point cloud data shown in FIG. 7 may be respectively or completely combined into one or more units to constitute the apparatus, or some unit(s) therein may be further divided into a plurality of functionally smaller subunits, and the same operation may be realized without affecting the achievement of the technical effects of embodiments of this disclosure. The modules are divided based on logical functions. In practice, the functions of one module may alternatively be realized by a plurality of units, or the functions of a plurality of modules may be realized by one unit. In other embodiments of this disclosure, the apparatus for encoding point cloud data may further include other units. In practice, the functions may alternatively be realized with the aid of other units, and may be realized in cooperation by a plurality of units.

In the embodiments of this disclosure, a signal within a data block in point cloud data and a signal feature of the signal within the data block are obtained, where an encoding mode of the point cloud data is an encoding mode of non-equal length encoding, and the signal is configured for reflecting a media attribute of the data block. It can be seen that by adopting the encoding mode of non-equal length encoding, a data size of encoded data of the data block can be reduced. A target encoding parameter of the data block under the encoding mode is determined according to the signal feature of the signal within the data block. The encoded data of the data block herein is bits for describing the encoded data of the data block. To be specific, the encoded data of the data block is a length of the encoded data of the data block. The signal within the data block is coded according to the target encoding parameter to obtain encoded data of the data block. It can be seen that by encoding the signal of the data block with an accurate target encoding parameter, the signal may be represented with less codes, so as to reduce the data size of the encoded data corresponding to the data block, reduce the pressure of network transmission, reduce the receiving pressure of a decoding device to receive the encoded data, and improve the decoding efficiency of the encoded data. In other words, it is adaptively determined how many codes are required to describe the encoded data of the data block based on the signal feature of the signal within the data block. To be specific, data blocks having different signal features have different codes. In this way, the redundancy of the encoded data of the data block can be effectively reduced, the length of the encoded data of the data block can be reduced, and the transmission efficiency of the encoded data of the data block can be improved.

Figure 8:
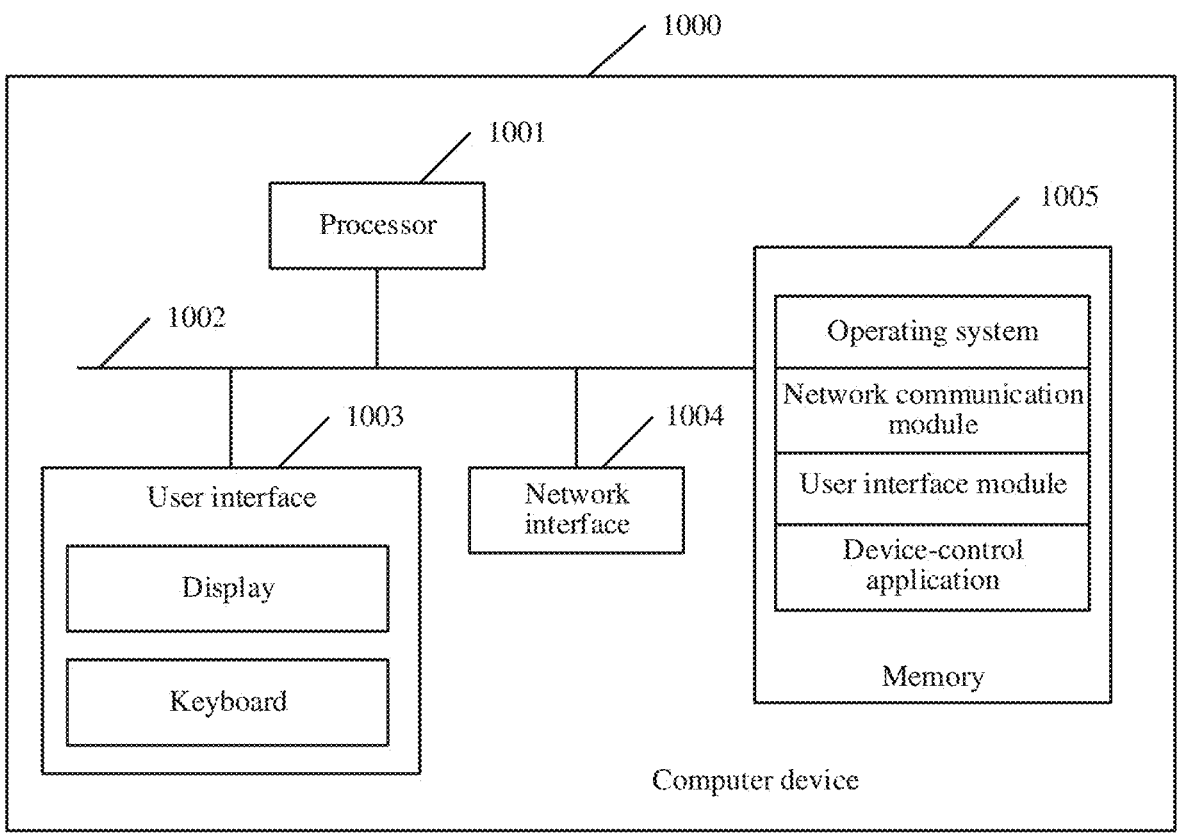
FIG. 8 is a schematic structural diagram of a computer device according to embodiments of this disclosure.

Reference is made to FIG. 8. FIG. 8 is a schematic structural diagram of a computer device according to embodiments of this disclosure. As shown in FIG. 8, the computer device 1000 may include: a processor 1001, a network interface 1004, and a memory 1005. Furthermore, the computer device 1000 may further include: a user interface 1003 and at least one communication bus 1002. The communication bus 1002 is configured to implement connection and communication between the components. The user interface 1003 may include a display and a keyboard. In some embodiments, the user interface 1003 may further include a standard wired interface and wireless interface. In an implementation, the network interface 1004 may include a standard wired interface and wireless interface (such as a WI-FI interface). The memory 1005 may be a high-speed random access memory (RAM), or may be a non-volatile memory, for example, at least one magnetic disk memory. In an implementation, the memory 1005 may further be at least one storage apparatus which is located far away from the processor 1001. As shown in FIG. 8, the memory 1005 used as a computer-readable storage medium may include an operating system, a network communication module, a user interface module, and a device-control application.

In the computer device 1000 as shown in FIG. 8, the network interface 1004 may provide a network communication function. The user interface 1003 is mainly used as an interface enabling input by a user. And the processor 1001 may be configured to invoke the device-control application stored in the memory 1005 to:

obtain encoded data of a data block in point cloud data, where the encoded data of the data block is obtained by encoding a signal in the data block according to a target encoding parameter, the target encoding parameter is an encoding parameter of the data block under an encoding mode of non-equal length encoding, and the target encoding parameter is determined based on a signal feature of the signal;

determine a target decoding parameter of the data block according to the target encoding parameter; and decode the encoded data of the data block according to the target decoding parameter to obtain a decoded signal of the data block, where the decoded signal is configured for reflecting a media attribute of the data block.

The computer device 1000 described in the embodiments of this disclosure may perform the description of the method for decoding point cloud data in the embodiment corresponding to FIG. 5, as well as the description of the apparatus for decoding point cloud data in the embodiment corresponding to FIG. 7. Details are not described herein again. In addition, details about the description of beneficial effects of the same method are not described herein again.

Figure 9:
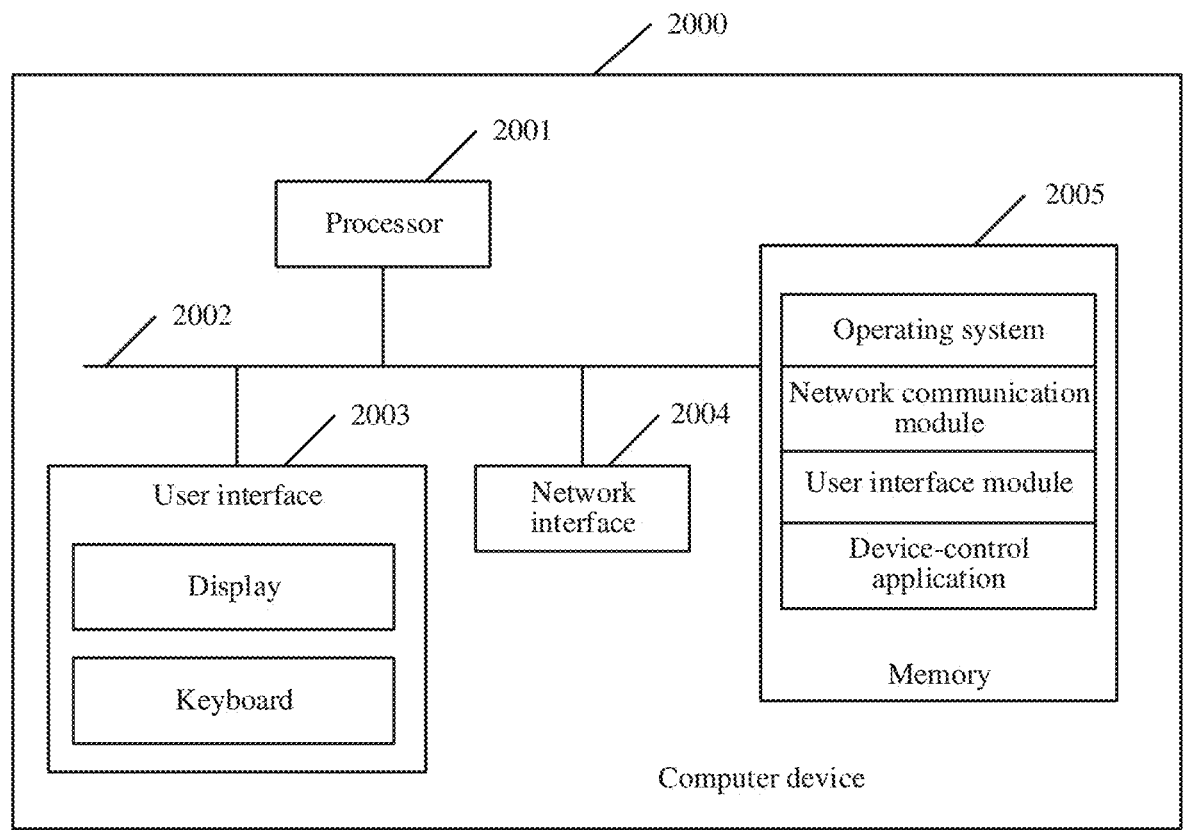
FIG. 9 is a schematic structural diagram of a computer device according to embodiments of this disclosure.

Reference is made to FIG. 9. FIG. 9 is a schematic structural diagram of a computer device according to embodiments of this disclosure. As shown in FIG. 9, the computer device 2000 may include: a processor 2001, a network interface 2004, and a memory 2005. In addition, the computer device 2000 may further include: a user interface 2003 and at least one communication bus 2002. The communication bus 2002 is configured to implement connection and communication between the components. The user interface 2003 may include a display and a keyboard. In some embodiments, the user interface 2003 may further include a standard wired interface and wireless interface. In an implementation, the network interface 2004 may include a standard wired interface and wireless interface (such as a WI-FI interface). The memory 2005 may be a high-speed random access memory (RAM), or may be a non-volatile memory, for example, at least one magnetic disk memory. In an implementation, the memory 2005 may further be at least one storage apparatus which is located far away from the processor 2001. As shown in FIG. 9, the memory 2005 used as a computer-readable storage medium may include an operating system, a network communication module, a user interface module, and a device-control application.

In the computer device 2000 as shown in FIG. 9, the network interface 2004 may provide a network communication function. The user interface 2003 is mainly used as an interface enabling input by a user. And the processor 2001 may be configured to invoke the device-control application stored in the memory 2005 to:

obtain a signal within a data block in point cloud data and a signal feature of the signal, where an encoding mode of the point cloud data is an encoding mode of non-equal length encoding, and the signal is configured for reflecting a media attribute of the data block;

determine, according to the signal feature of the signal, a target encoding parameter of the data block under the encoding mode; and code the signal according to the target encoding parameter to obtain encoded data of the data block.

The computer device 2000 described in the embodiments of this disclosure may perform the description of the method for encoding point cloud data in the embodiment corresponding to FIG. 2, as well as the description of the apparatus for encoding point cloud data in the embodiment corresponding to FIG. 6. Details are not described herein again. In addition, details about the description of beneficial effects of the same method are not described herein again.

Furthermore, embodiments of this disclosure further provide a computer-readable storage medium, the computer-readable storage medium has a computer program executed by the aforementioned apparatus for decoding point cloud data stored therein, and the computer program includes program instructions. When a processor executes the program instructions, the method for decoding point cloud data in the embodiment corresponding to FIG. 5 can be performed, or the method for encoding point cloud data in the embodiment corresponding to FIG. 2 can be performed. Therefore, details are not described herein again.

In addition, details about the description of beneficial effects of the same method are not described herein again. For technical details that are not disclosed in the computer-readable storage medium embodiments involved in this disclosure, reference is made to the description of the method embodiments of this disclosure. As an example, the program instructions may be deployed to be executed on a computing device, or on a plurality of computing devices located at one site, or on a plurality of computing devices distributed across a plurality of sites and interconnected by a communication network. The plurality of computing devices distributed across the plurality of sites and interconnected by the communication network may form a blockchain network.

Furthermore, embodiments of this disclosure further provide a computer program product. The computer program product may include a computer program. The computer program may be stored in a computer-readable storage medium. A processor of a computer device reads the computer program from the computer-readable storage medium. The processor may execute the computer program, so as to cause the computer device to perform the method for decoding point cloud data in the embodiment corresponding to FIG. 5, or the description of the method for encoding point cloud data in the embodiment corresponding to FIG. 2. Therefore, details are not described herein again. In addition, details about the description of beneficial effects of the same method are not described herein again. For technical details that are not disclosed in the computer program product or computer program embodiments involved in this disclosure, reference is made to the description of the method embodiments of this disclosure.

To simplify the description, the foregoing method embodiments are described as a series of action combinations. However, a person skilled in the art may know that this disclosure is not limited to any described order of the actions, as some operations may be performed in another order simultaneously according to this disclosure. In addition, a person skilled in the art may also know that all the embodiments described in the specification are preferred embodiments, and the actions and modules involved are not necessarily mandatory to this disclosure.

The operations in the methods according to the embodiments of this disclosure may be sequentially adjusted, merged, and deleted according to actual requirements.

The modules in the apparatuses according to the embodiments of this disclosure may be merged, divided, and deleted according to actual requirements.

A person of ordinary skill in the art may appreciate that all or some of processes of the methods in the embodiments may be implemented by a computer program instructing relevant hardware. The program may be stored in a computer-readable storage medium. When the program is executed, the processes of the embodiments of the methods may be included. The storage medium may be a magnetic disc, an optical disc, a read-only memory (ROM), a random access memory (RAM), or the like.

What is disclosed above is merely exemplary embodiments of the present disclosure, and is not intended to limit the scope of the claims of the present disclosure. Therefore, equivalent variations made in accordance with the claims of the present disclosure shall fall within the scope of the present disclosure.

What is claimed is:

1. A method for decoding point cloud data, the method being performed by a computer device and comprising:

obtaining encoded data of a data block in point cloud data, the encoded data of the data block being obtained by encoding a signal in the data block according to a target encoding parameter, the target encoding parameter being an encoding parameter of the data block under an encoding mode of non-equal length encoding, and the target encoding parameter being determined based on a signal feature of the signal;

determining a target decoding parameter of the data block according to the target encoding parameter, the determining the target decoding parameter comprises:

in response to the target encoding parameter being determined based on data blocks having an adjacent relationship, obtaining a signal range value of the signal;

determining, according to the signal range value of the signal, an initial decoding parameter of the data block;

obtaining a decoded data block having an adjacent relationship with the data block in the point cloud data; and adjusting, according to a decoded signal of the decoded data, the initial decoding parameter to obtain the target decoding parameter; and decoding the encoded data of the data block according to the target decoding parameter to obtain a decoded signal of the data block, the decoded signal being configured for reflecting a media attribute of the data block.

2. The method according to claim 1, the method further comprises:

obtaining the target encoding parameter from a parameter set corresponding to the point cloud data; and the determining the target decoding parameter of the data block according to the target encoding parameter comprises:

determining the target encoding parameter as the target decoding parameter.

3. The method according to claim 1, wherein the determining the target decoding parameter of the data block according to the target encoding parameter comprises:

in response to the target encoding parameter being determined based on parameter table query, obtaining a signal range value of the signal;

determining, according to the signal range value of the signal, an index value corresponding to the data block;

querying, from a first parameter table, a decoding parameter associated with the index value, the first parameter table comprising at least one index value and a decoding parameter associated with each index value in the at least one index value; and determining the queried decoding parameter as the target decoding parameter.

4. The method according to claim 1, wherein the initial decoding parameter is an initial order, and the adjusting the initial decoding parameter to obtain the target decoding parameter comprises:

determining a final signal value of the decoded signal of the decoded data block;

determining a first limiting order and a second limiting order according to the initial order, the first limiting order being less than the second limiting order;

obtaining a magnitude relationship between the final signal value and the first and second limiting orders;

adjusting the initial order according to the magnitude relationship to obtain a target order associated with the data block; and determining the target order as the target decoding parameter.

5. The method according to claim 4, wherein the adjusting the initial order according to the magnitude relationship to obtain the target order associated with the data block comprises:

in response to the magnitude relationship indicating that the final signal value is less than the first limiting order, determining a sum of the initial order and a first adjustment step as the target order;

in response to the magnitude relationship indicating that the final signal value is greater than the second limiting order, determining a difference between the initial order and the first adjustment step as the target order; and in response to the magnitude relationship indicating that the final signal value is greater than or equal to the first limiting order and is less than or equal to the second limiting order, determining the initial order as the target order.

6. The method according to claim 4, wherein the adjusting the initial order according to the magnitude relationship to obtain the target order associated with the data block comprises:

obtaining a decoding parameter corresponding to the decoded data block, the decoding parameter of the decoded data block comprising a historical order of the decoded data block;

in response to the magnitude relationship indicating that the final signal value is less than the first limiting order, determining a sum of the historical order and a second adjustment step as the target order;

in response to the magnitude relationship indicating that the final signal value is greater than the second limiting order, determining a difference between the historical order and the second adjustment step as the target order; and in response to the magnitude relationship indicating that the final signal value is greater than or equal to the first limiting order and is less than or equal to the second limiting order, determining the initial order as the target order.

7. The method according to claim 4, wherein the adjusting the initial order according to the magnitude relationship to obtain the target order associated with the data block comprises:

adjusting the initial order according to the magnitude relationship to obtain a candidate order associated with the data block;

in response to the candidate order being less than or equal to a third limiting order, determining a sum of the candidate order and a third adjustment step as the target order;

in response to the candidate order being greater than or equal to a fourth limiting order, a difference between the candidate order and the third adjustment step as the target order, determining the third limiting order being less than the fourth limiting order; and in response to the candidate order being greater than the third limiting order and less than the fourth limiting order, determining the candidate order as the target order.

8. The method according to claim 3, wherein the signal range value of the signal is determined based on a maximum signal and a minimum signal within the data block; or the signal range value of the signal is determined based on a sampling precision of the signal within the data block.

9. The method according to claim 1, wherein the encoded data of the data block comprises first encoded data and second encoded data, the first encoded data having a different attribute type from the second encoded data;

the target decoding parameter comprises a first decoding parameter and a second decoding parameter, the first decoding parameter being configured for decoding the first encoded data, and the second decoding parameter being configured for decoding the second encoded data; and the first decoding parameter being different from the second decoding parameter.

10. The method according to claim 9, wherein the first encoded data comprises first sub-encoded data, second sub-encoded data, and third sub-encoded data;

the first decoding parameter is determined based on sub-signal features corresponding to the first sub-encoded data, the second sub-encoded data, and the third sub-encoded data, respectively; or decoding parameters corresponding to the first sub-encoded data, the second sub-encoded data, and the third sub-encoded data, respectively, are determined as the first decoding parameter; or a decoding parameter corresponding to associated information associated with the first encoded data is determined as the first decoding parameter.

11. The method according to claim 10, wherein the first encoded data comprises first sub-encoded data, second sub-encoded data, and third sub-encoded data, and the first decoding parameter comprises a first sub-decoding parameter corresponding to the first sub-encoded data, a second sub-decoding parameter corresponding to the second sub-encoded data, and a third sub-decoding parameter corresponding to the third sub-encoded data;

the first sub-decoding parameter is determined based on a sub-signal feature corresponding to the first sub-encoded data;

the second sub-decoding parameter is determined based on the first sub-decoding parameter and a parameter offset; and the third sub-decoding parameter is determined based on the second sub-decoding parameter and the parameter offset.

12. The method according to claim 1, wherein the encoded data of the data block comprises an encoding flag and a signal threshold;

the decoding the encoded data of the data block according to the target decoding parameter to obtain a decoded signal of the data block comprises:

in response to the encoding flag in the encoded data of the data block being a first encoding flag, decoding the encoded data according to the target decoding parameter to obtain an initial decoded signal;

summing the initial decoded signal according to the signal threshold to obtain the decoded signal of the data block, the first encoding flag being configured for indicating that the decoded signal of the data block is different from the signal threshold; and in response to the encoding flag in the encoded data of the data block being a second encoding flag, determining the signal threshold as the decoded signal of the data block, the second encoding flag being configured for indicating that the decoded signal of the data block is the same as the signal threshold.

13. A method for encoding point cloud data, the method being performed by a computer device and comprising:

obtaining a signal within a data block in point cloud data and a signal feature of the signal, an encoding mode of the point cloud data being an encoding mode of non-equal length encoding, and the signal being configured for reflecting a media attribute of the data block;

determining, according to the signal feature of the signal, a target encoding parameter of the data block under the encoding mode, wherein the signal feature of the signal comprises a signal range value of the signal, and the signal range value is determined based on a maximum signal and a minimum signal within the data block, or based on a sampling precision of the signal; and encoding the signal according to the target encoding parameter to obtain encoded data of the data block.

14. The method according to claim 13, wherein the determining the target encoding parameter of the data block under the encoding mode comprises:

quantizing the signal range value in the signal feature to obtain a quantized signal range value;

obtaining a logarithmic value of the quantized signal range value, and differencing the logarithmic value to obtain an index value corresponding to the data block;

querying, from a second parameter table, an encoding parameter associated with the index value, the second parameter table comprising at least one index value and an encoding parameter associated with each index value in the at least one index value, the number of index values in the second parameter table being the same as the number of data blocks in a first data group, the first data group being a data group comprising the data block in at least two data groups, the at least two data groups being data groups in the point cloud data, the index value falling within an index value range, and the index value range being determined according to the at least one index value in the second parameter table; and determining the queried encoding parameter as the target encoding parameter.

15. The method according to claim 13, wherein the determining the target encoding parameter of the data block under the encoding mode comprises:

determining, according to the signal feature of the signal, an initial encoding parameter of the data block under the encoding mode;

obtaining a coded data block having an adjacent relationship with the data block in the point cloud data; and adjusting, according to encoded data of the coded data block, the initial encoding parameter to obtain the target encoding parameter.

16. The method according to claim 15, wherein the initial encoding parameter is an initial order, and the adjusting the initial encoding parameter to obtain the target encoding parameter comprises:

determining a final encoding value of the encoded data of the coded data block;

determining a first limiting order and a second limiting order according to the initial order, the first limiting order being less than the second limiting order;

obtaining a magnitude relationship between the final encoding value and the first and second limiting orders;

adjusting the initial order according to the magnitude relationship to obtain a target order associated with the data block; and determining the target order as the target encoding parameter.

17. The method according to claim 16, wherein the adjusting the initial order according to the magnitude relationship to obtain the target order associated with the data block comprises:

in response to the magnitude relationship indicating that the final encoding value is less than the first limiting order, determining a sum of the initial order and a first adjustment step as the target order;

in response to the magnitude relationship indicating that the final encoding value is greater than the second limiting order, determining a difference between the initial order and the first adjustment step as the target order; and in response to the magnitude relationship indicating that the final encoding value is greater than or equal to the first limiting order and is less than or equal to the second limiting order, determining the initial order as the target order.

18. An apparatus for decoding point cloud data, comprising:

a memory operable to store computer-readable instructions; and a processor circuitry operable to read the computer-readable instructions, the processor circuitry when executing the computer-readable instructions is configured to:

obtain encoded data of a data block in point cloud data, the encoded data of the data block being obtained by encoding a signal in the data block according to a target encoding parameter, the target encoding parameter being an encoding parameter of the data block under an encoding mode of non-equal length encoding, and the target encoding parameter being determined based on a signal feature of the signal;

in response to the target encoding parameter being determined based on data blocks having an adjacent relationship, obtain a signal range value of the signal;

determine, according to the signal range value of the signal, an initial decoding parameter of the data block;

obtain a decoded data block having an adjacent relationship with the data block in the point cloud data;

adjust, according to a decoded signal of the decoded data, the initial decoding parameter to obtain a target decoding parameter; and decode the encoded data of the data block according to the target decoding parameter to obtain a decoded signal of the data block, the decoded signal being configured for reflecting a media attribute of the data block.

* * * * *